US011122152B2

(12) United States Patent
Liu et al.

(10) Patent No.: US 11,122,152 B2
(45) Date of Patent: Sep. 14, 2021

(54) DATA PROCESSING METHOD AND APPARATUS TO REDUCE AN OVERHEAD IN A LAYER TWO PROTOCOL

(71) Applicant: China Academy of Telecommunications Technology, Beijing (CN)

(72) Inventors: Jiamin Liu, Beijing (CN); Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 353 days.

(21) Appl. No.: 16/316,299

(22) PCT Filed: Jun. 2, 2017

(86) PCT No.: PCT/CN2017/087039
§ 371 (c)(1),
(2) Date: Jan. 8, 2019

(87) PCT Pub. No.: WO2018/006674
PCT Pub. Date: Jan. 11, 2018

(65) Prior Publication Data
US 2021/0099554 A1   Apr. 1, 2021

(30) Foreign Application Priority Data
Jul. 8, 2016   (CN) .......................... 201610538821.X

(51) Int. Cl.
*H04L 29/06*   (2006.01)
*H04L 1/08*   (2006.01)
(Continued)

(52) U.S. Cl.
CPC ................ *H04L 69/22* (2013.01); *H04L 1/08* (2013.01); *H04L 69/28* (2013.01); *H04L 69/321* (2013.01);
(Continued)

(58) Field of Classification Search
CPC ..... H04L 29/08; H04L 69/321; H04L 69/324; H04L 69/12; H04L 49/90; H04W 88/02; H04W 28/06; H04W 80/02
See application file for complete search history.

(56) References Cited

U.S. PATENT DOCUMENTS

2008/0310452 A1   12/2008   Vedantham et al.
2009/0238124 A1*   9/2009   Pragada ................ H04W 28/06
                                                     370/329
(Continued)

FOREIGN PATENT DOCUMENTS

CN      1852075 A     10/2006
CN    101039228 A      9/2007
(Continued)

OTHER PUBLICATIONS

3GPP, Technical Report: 3rd Generation Partnership Project; Technical Specification Group Radio Access Network;Study on Small Cell enhancements for E-UTRA and E-UTRAN; Higher layer aspects(Release 12), 3GPP TR 36.842 V12.0.0 (Dec. 2013), 2013, pp. 1-71.

*Primary Examiner* — Mewale A Ambaye
(74) *Attorney, Agent, or Firm* — Foley & Lardner LLP

(57) ABSTRACT

Disclosed in the present application are a data processing method and apparatus. The method comprises: on a sending end, receiving a to-be-sent data packet transmitted from a higher layer, and performing "transport-layer layer-1" processing on the to-be-sent data packet, comprising assigning a sequence number; and then performing "transport-layer layer-2" processing, comprising: according to the size of a
(Continued)

transmission resource obtained by means of scheduling, transferring the to-be-sent data packet to a physical layer and then sending out the to-be-sent data packet through an air interface; on a reception end, receiving the data packet that is sent from the air interface and then that is transmitted by the physical layer; performing "transport-layer layer-2" processing on the received data packet, comprising: transmitting the data packet transmitted by the physical layer, to the transport-layer layer-2 to perform processing.

17 Claims, 8 Drawing Sheets

(51) Int. Cl.
*H04L 29/08* (2006.01)
*H04W 72/12* (2009.01)

(52) U.S. Cl.
CPC .......... *H04L 69/324* (2013.01); *H04L 69/326* (2013.01); *H04W 72/12* (2013.01)

(56) References Cited

U.S. PATENT DOCUMENTS

| | | | | |
|---|---|---|---|---|
| 2018/0124843 A1* | 5/2018 | Shaheen | ............... | H04W 80/02 |
| 2019/0174466 A1* | 6/2019 | Zhang | ................... | H04L 5/0048 |
| 2019/0387535 A1* | 12/2019 | Kim | ........................ | H04L 1/08 |
| 2020/0169916 A1* | 5/2020 | Gholmieh | ........... | H04W 12/106 |
| 2020/0229111 A1* | 7/2020 | Kim | .................. | H04W 74/0833 |

FOREIGN PATENT DOCUMENTS

| | | |
|---|---|---|
| CN | 10264 7332 A | 8/2012 |
| CN | 102638328 A | 8/2012 |
| EP | 1 959 601 A1 | 8/2008 |
| WO | WO-2009/062066 A2 | 5/2009 |

* cited by examiner

--Prior Art--

--Prior Art--

--Prior Art--

--Prior Art--

--Prior Art--

--Prior Art--

DATA PROCESSING METHOD AND APPARATUS TO REDUCE AN OVERHEAD IN A LAYER TWO PROTOCOL

This application is a National Stage International Application No. PCT/CN2017/087039, filed Jun. 2, 2017, which claims the priority of Chinese Patent Application No. 201610538821.X, filed with the Chinese Patent Office on Jul. 8, 2016, and entitled "A method and apparatus for processing data", both of which are hereby incorporated by reference in their entireties.

FIELD

The present invention relates to the field of wireless communications, and particularly to a method and apparatus for processing data.

BACKGROUND

FIG. 1 is a schematic diagram of a user-plane protocol stack, and as illustrated, in a process of transmitting data in the existing communication system, data are typically transmitted between a user Equipment (UE) and an evolved Node B (eNB) through the Packet Data Convergence Protocol (MCP); Radio Link Control (RLC), Media Access Control (MAC), and Physical (PHY) layers, where the respective layers process the data differently. The PDCP layer generally performs security operations, and header compression and decompression, encryption and integrity protection, Robust Header Compression (ROHC) and decompression; etc.; the RLC layer generally segments and concatenates the data, delivers them in order, guarantees data transmission using an Automatic Repeat Request (ARQ); the MAC layer generally schedules resources, concatenates different logic channels, and handles a Hybrid Automatic Repeat Request (HARQ); and the physical layer packages transport blocks and transmits them via an air interface.

FIG. 2 is a schematic diagram of a Radio Protocol Architecture for dual connectivity, where a Master Cell Group (MCG) is a group of serving cells controlled by a Master Node B (MeNB) in the dual-connectivity architecture, and a Secondary Cell Group (SCG) is a group of serving cells controlled by a Secondary Node B (SeNB) in the dual-connectivity architecture; and as illustrated, user data which are bore over an MCG bearer and an SCG bearer can be offloaded between different eNBs, and processed respectively by two eNBs at the RLC layer, and the protocol layers below the RLC layer, in the dual-connectivity architecture.

Processing of data in the layer two protocol, L2, will be described below in brief.

FIG. 3 is a schematic diagram of processing data at the PDCP layer, and as illustrated, the PDCP layer generally functions to perform security-related operations (encryption and decryption, integrity protection and verification, etc.), and header compression and decompression.

FIG. 4 is a schematic structural diagram of a PDCP PDU, and as illustrated, a transmitting PDCP entity processes received IP data packets, and then generates a PDCP Protocol Data Unit (PDU), where a PDCP header includes a PDCP layer Sequence Number (SN) in the structure of the PDCP PDU as illustrated in FIG. 4.

FIG. 5 is a schematic diagram of processing data in the RLC TM mode, FIG. 6 is a schematic diagram of processing data in the RLC UM mode, and FIG. 7 is a schematic diagram of processing data in the RLC AM mode; and as illustrated, the RLC layer generally functions to segment the data, to segment and concatenate the data, to deliver them in order, and to handle an ARQ. The RLC layer supports three modes: the Transparent Mode (AM), the Unacknowledged Mode (UM), and the Acknowledged Mode (AM).

FIG. 8 is a schematic diagram of generating an RLC PDU, where the RLC PDU is transmitted transparently at the RLC layer in the RLC TM mode, so no RLC header no RLC SN) is added thereto. However in the RL UM and AM modes, the RLC layer operates to segment and concatenate RLC Service Data Units (SDUs) (i.e., PDCP PDUs) into RLC PDUs according to scheduling information indicated by the MAC layer. FIG. 8 illustrates a process of segmenting or concatenating RLC SDUs into RLC PDUs. An SN shall be allocated for each RLC PDU, and the SN is carried in a header of the RLC PDU.

The MAC layer generally functions to perform uplink or downlink scheduling over a resource of the PHY layer. For downlink scheduling, the MAC layer of the eNB shall instruct the RLC layer to compose an RLC PDU, upon determining scheduling information, and then the MAC layer multiplexes RLC PDUs from different logic channels of a UE into a downlink MAC PDU. For uplink scheduling, the MAC layer of the eNB indicates scheduling information to the UE over a Physical Downlink Control Channel (PDCCH) upon determining the scheduling information, and the UE organizes an uplink MAC PDU according to priorities of uplink logic channels.

A drawback in the prior art lies in that some functions of the respective layers in the layer two protocol overlap with each other, thus resulting in a functional redundancy and a considerable overhead.

SUMMARY

The invention provides a method and apparatus for processing data so as to lower an overhead in the layer two protocol.

An embodiment of the invention provides a method for processing data, the method including:

receiving transmission data packets transmitted from a higher layer, wherein the transmission data packets are data packets to be transmitted by a transmitter;

processing the received transmission data packets at a transport layer 1, wherein processing at the transport layer 1 during transmission includes: allocating SNs; and processing the transmission data packets processed at the transport layer 1, at a transport layer 2, wherein processing at the transport layer 2 during transmission includes: passing the transmission data packets to a physical layer according to the size of a scheduled transmission resource so that they are transmitted via an air interface.

Optionally processing at the transport layer 1 further includes: header-compressing and security-processing the data packets after allocating the SNs.

Optionally processing at the transport layer 1 further during transmission includes:

deciding whether to segment the data packets to be initially transmitted, at the transport layer 1 according to a configuration, and/or deciding whether to segment the data packets to be retransmitted, at the transport layer 1 according to a configuration, and if so, then passing the transmission data packets segmented at the transport layer 1 to the transport layer 2 for processing, wherein the configuration for initial transmission of the data packets is the same as or different from the configuration for retransmission of the data packets.

Optionally whether to segment the data packets is decided according to a static configuration via RRC signaling.

Optionally processing at the transport layer 1 during transmission in the AM mode further includes at least one of followings:

defining a transmission window, maintaining the transmission window, and transmitting the data packets in the transmission window;

setting P bits in the data packets or data packet segments to trigger a receiver to feed back a status report;

segmenting the data packets as configured via signaling of the network side; and retransmitting the data packets are retransmitted based upon reception status feedback of the counterpart end, or feedback information about processing at the transport layer 2.

Optionally processing at the transport layer 1 is performed on one logic entity; and processing at the transport layer 2 is performed on one or at least two logic entities.

Optionally when processing at the transport layer 2 is performed on at least two logic entities, the logic entity performing processing at the transport layer 1 distributes the processed data packets to at least one of the two logic entities performing processing at the transport layer 2; or the logic entity performing processing at the transport layer 1 duplicates and then distributes the processed data packets to the two logic entities performing processing at the transport layer 2.

Optionally when processing at the transport layer 2 is performed on at least two logic entities, the method further includes:

retransmitting the data packets to a logic entity originally performing processing at the transport layer 2, or the other logic entity performing processing at the transport layer 2.

An embodiment of the invention provides a method for processing data, the method including:

receiving data packets received via an air interface, and then transmitted from a physical layer;

processing the received data packets at a transport layer 2, wherein processing at the transport layer 2 during reception includes: transmitting the data packets transmitted from the physical layer, to the transport layer 2; and processing the data packets processed at the transport layer 2, at a transport layer 1, wherein processing at the transport layer 1 during reception includes: reordering the data packets into transmission data packets according to their SNs, wherein the transmission data packets are data packets to be transmitted by a transmitter.

Optionally processing at the transport layer 2 during reception further includes: re-assembling the data packets before transmitting them to the transport layer 1.

Optionally processing at the transport layer 2 is performed on first sub-layer protocol entities and a second sub-layer protocol entity, wherein the first sub-layer protocol entities receive the data packets processed by the second sub-layer protocol entity, and the second sub-layer protocol entity receives the data packets transmitted from the physical layer, so the data packets are re-assembled as follows: processing at the transport layer 2 is performed on first sub-layer protocol entities and a second sub-layer protocol entity, wherein the first sub-layer protocol entities receive the data packets processed by the second sub-layer protocol entity, and the second sub-layer protocol entity receives the data packets transmitted from the physical layer, so the data packets are re-assembled as follows: the second sub-layer protocol entity processes data packets of different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets.

Optionally re-assembling the data packets includes:

de-packaging data packets of each logic channel into different PDUs or PDU segments to be processed at the transport layer 1, under a packaging rule; and if the data packets are de-packaged into PDUs, then passing the PDUs to the transport layer 1 for processing, or if the data packets are de-packaged into PDU segments, then if the transport layer 1 is configured with a PDU segmentation function, then passing the PDU segments to the transport layer 1 for processing; otherwise, composing the PDU segments into PDUs, and then passing the PDUs to the transport layer 1 for processing.

Optionally processing at the transport layer 1 during reception further includes:

after the data packets are reordered according to their SNs, feeding back an incorrectly received data packet, and inversely security-processing and header-decompressing correctly received data packets into the transmission data packets.

Optionally processing at the transport layer 1 during reception further includes:

defining a reception window, maintaining the reception window, and receiving and/or reordering the data packets in the reception window, wherein the data packets are reordered as follows:

when the data packets are received out of order, a reordering timer is started, and the highest SN in a reception queue at this time is recorded;

before the reordering timer expires, if the data packets are not received out of order, then the reordering timer will be stopped; otherwise, the reordering timer will be restarted, and the highest SN in the current reception queue will be recorded; and if the reordering timer expires, then if a PDU corresponding to some SN preceding to the recorded SN corresponding to the reordering timer has not been received, then it will be determined that the data packet fails to be transmitted.

Optionally processing at the transport layer 1 during transmission in the AM mode further includes at least one of followings:

defining a reception window, maintaining the reception window, and receiving the data packets in the reception window; and when data lying into the reception window are received, if there is a gap in a reception sequence, then starting a reordering timer, and if the data packet has not been received after the reordering timer expires, then determining that the data fail to be transmitted, and feeding a status report back to the receiver.

An embodiment of the invention provides an apparatus for processing data, the apparatus including:

a transmission data packet receiving module configured to receive transmission data packets transmitted from a higher layer, wherein the transmission data packets are data packets to be transmitted by a transmitter:

a transport layer 1 processing module configured to process the received transmission data packets at a transport layer 1, wherein processing at the transport layer 1 during transmission includes: allocating SNs; and a transport layer 2 processing module to process the transmission data packets processed at the transport layer 1, at a transport layer 2, wherein processing at the transport layer 2 during transmission includes: passing the transmission data packets to a physical layer according to the size of a scheduled transmission resource so that they are transmitted via an air interface.

Optionally the transport layer 1 processing module is further configured during transmission to header-compress and security-process the data packets after allocating the SNs.

Optionally the transport layer 1 processing module is further configured during transmission to decide whether to segment the data packets to be initially transmitted, at the transport layer 1 according to a configuration, and/or to decide whether to segment the data packets to be retransmitted, at the transport layer 1 according to a configuration, and if so, to pass the transmission data packets segmented at the transport layer 1 to the transport layer 2 for processing, wherein the configuration for initial transmission of the data packets is the same as or different from the configuration for retransmission of the data packets.

Optionally the transport layer 1 processing module is further configured during transmission to decide whether to segment the data packets, according to a static configuration via RRC signaling.

Optionally the transport layer 1 processing module is further configured during transmission in the AM mode to perform at least one of followings:

to define a transmission window, to maintain the transmission window, and to transmit the data packets in the transmission window;

to set P bits in the data packets or data packet segments to trigger a receiver to feed back a status report;

to segment the data packets as configured via signaling of the network side; and to retransmit the data packets are retransmitted based upon reception status feedback of the counterpart end, or feedback information about processing at the transport layer 2.

Optionally the transport layer 1 processing module is further configured to perform processing at the transport layer 1 on one logic entity and the transport layer 2 processing module is further configured to perform processing at the transport layer 2 on one or at least two logic entities.

Optionally when processing at the transport layer 2 is performed on at least two logic entities, the logic entity performing processing at the transport layer 1 distributes the processed data packets to at least one of the two logic entities performing processing at the transport layer 2; or the logic entity performing processing at the transport layer 1 duplicates and then distributes the processed data packets to the two logic entities performing processing at the transport layer 2.

Optionally when processing at the transport layer 2 is performed on at least two logic entities, the transport layer 1 processing module is further configured to retransmit the data packets to a logic entity originally performing processing at the transport layer 2, or the other logic entity performing processing at the transport layer 2.

Optionally the transport layer 2 processing module is further configured to segment and concatenate the data packets before passing them to the physical layer.

Optionally the transport layer 1 processing module and/or the transport layer 2 processing module is further configured to segment and concatenate the data packets by identifying the transmission data packets to identify logical channels from which they come.

Optionally the transport layer 2 processing module is further configured to segment the data packets by identifying the data packets using the SNs, and to segment the data packets according to payloads of the data packets processed at the transport layer 1.

Optionally the transport layer 2 processing module is further configured to perform processing at the transport layer 2 on a first sub-layer protocol entity and a second sub-layer protocol entity, wherein the first sub-layer protocol entity receives the data packets processed at the transport layer 1, and the second sub-layer protocol entity receives the data packets processed by the first sub-layer protocol entity, so the data packets are segmented and concatenated as follows according to the size of a scheduled transmission resource:

the second sub-layer protocol entity informs the first sub-layer protocol entity of a size of the data packets after finishing a schedule;

the first sub-layer protocol entity segments and concatenates the data packets processed at the transport layer 1; and the second sub-layer protocol entity receives the data packets segmented and concatenated by the first sub-layer protocol entity, and then adds identification information to the data packets from different logic channels, multiplexes the data packets of the different logic channels into transmission channel data packets, and transmits them to the physical layer.

An embodiment of the invention provides a method for processing data, the method including:

a data packet receiving module configured to receive data packets received via an air interface, and then transmitted from a physical layer;

a transport layer 2 processing module configured to process the received data packets at a transport layer 2, wherein processing at the transport layer 2 during reception includes: transmitting the data packets transmitted from the physical layer, to the transport layer 2; and a transport layer 1 processing module configured to process the data packets processed at the transport layer 2, at a transport layer 1, wherein processing at the transport layer 1 during reception includes: reordering the data packets into transmission data packets according to their SNs, wherein the transmission data packets are data packets to be transmitted by a transmitter.

Optionally the transport layer 2 processing module is further configured during reception to re-assemble the data packets before transmitting them to the transport layer 1.

Optionally the transport layer 2 processing module is further configured during reception to perform processing at the transport layer 2 on first sub-layer protocol entities and a second sub-layer protocol entity, wherein the first sub-layer protocol entities receive the data packets processed by the second sub-layer protocol entity, and the second sub-layer protocol entity receives the data packets transmitted from the physical layer, so the data packets are re-assembled as follows:

the second sub-layer protocol entity processes data packets of different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets.

Optionally the transport layer 2 processing module configured to re-assemble the data packets is further configured:

to de-package data packets of each logic channel into different PDUs or PDU segments to be processed at the transport layer 1, under a packaging rule; and if the data packets are de-packaged into PDUs, to pass the PDUs to transport layer for processing, or if the data packets are de-packaged into PDU segments, then if the transport layer 1 is configured with a PDU segmentation function, to pass the PDU segments to the transport layer 1 for processing; otherwise, to compose the PDU segments into PDUs, and then pass the PDUs to the transport layer 1 for processing.

Optionally the transport layer 1 processing module is further configured during reception: after the data packets are reordered according to their SNs, to feed back an incorrectly received data packet, and to inversely security-process and header-decompress correctly received data packets into the transmission data packets.

Optionally the transport layer 1 processing module is further configured during reception to define a reception window to maintain the reception window, and to receive and/or reorder the data packets in the reception window, wherein the data packets are reordered as follows:

When the data packets are received out of order, a reordering timer is started, and the highest SN in a reception queue at this time is recorded;

before the reordering timer expires, if the data packets are not received out of order, then the reordering timer will be stopped; otherwise, the reordering timer will be restarted, and the highest SN in the current reception queue will be recorded; and if the reordering timer expires, then if a PDU corresponding to some SN preceding to the recorded SN corresponding to the reordering timer has not been received, then it will be determined that the data packet fails to be transmitted.

Optionally the transport layer 1 processing module is further configured during reception in the AM mode to perform at least one of followings:

to define a reception window, to maintain the reception window, and to receive the data packets in the reception window; and when data lying into the reception window are received, if there is a gap in a reception sequence, to start a reordering timer, and if the data packet has not been received after the reordering timer expires, to determine that the data fail to be transmitted, and to feed a status report back to the receiver.

An embodiment of the invention provides a method for processing data, the method including:

a processor configured to read and execute program in a memory:

to process received transmission data packets at a transport layer 1, wherein processing at the transport layer 1 during transmission includes: allocating SNs; and to process the transmission data packets processed at the transport layer 1, at a transport layer 2, wherein processing at the transport layer 2 during transmission includes: passing the transmission data packets to a physical layer according to the size of a scheduled transmission resource so that they are transmitted via an air interface; and a transceiver configured to receive and transmit data under the control of the processor:

to receive transmission the data packets transmitted from a higher layer, wherein the transmission data packets are data packets to be transmitted by a transmitter.

Optionally processing at the transport layer 1 further includes: header-compressing and security-processing the data packets after allocating the SNs.

Optionally processing at the transport layer 1 during transmission further includes:

deciding whether to segment the data packets to be initially transmitted, at the transport layer 1 according to a configuration, and/or deciding whether to segment the data packets to be retransmitted, at the transport layer 1 according to a configuration, and if so, then passing the transmission data packets segmented at the transport layer 1 to the transport layer 2 for processing, wherein the configuration for initial transmission of the data packets is the same as or different from the configuration for retransmission of the data packets.

Optionally whether to segment the data packets is decided according to a static configuration via RRC signaling.

Optionally processing at the transport layer 1 during transmission in the AM mode further includes at least one of followings:

defining a transmission window, maintaining the transmission window, and transmitting the data packets in the transmission window;

setting P bits in the data packets or data packet segments to trigger a receiver to feed back a status report;

segmenting the data packets as configured via signaling of the network side; and retransmitting the data packets are retransmitted based upon reception status feedback of the counterpart end, or feedback information about processing at the transport layer 2.

Optionally processing at the transport layer 1 is performed on one logic entity; and processing at the transport layer 2 is performed on one or at least two logic entities.

Optionally when processing at the transport layer 2 is performed on at least two logic entities, the logic entity performing processing at the transport layer 1 distributes the processed data packets to at least one of the two logic entities performing processing at the transport layer 2; or the logic entity performing processing at the transport layer 1 duplicates and then distributes the processed data packets to the two logic entities performing processing at the transport layer 2.

Optionally when processing at the transport layer 2 is performed on at least two logic entities, the processor is further configured:

to retransmit the data packets to a logic entity originally performing processing at the transport layer 2, or the other logic entity performing processing at the transport layer 2.

An embodiment of the invention provides a method for processing data, the method including:

a processor configured to read and execute program in a memory:

to process received data packets at a transport layer 2, wherein processing at the transport layer 2 during reception includes: transmitting the data packets transmitted from a physical layer, to the transport layer 2; and to process the data packets processed at the transport layer 2, at a transport layer wherein processing at the transport layer 1 during reception includes: reordering the data packets into transmission data packets according to their SNs, wherein the transmission data packets are data packets to be transmitted by a transmitter; and a transceiver configured to receive and transmit data under the control of the processor:

to receive the data packets received via an air interface, and then transmitted from the physical layer.

Optionally processing at the transport layer 2 during reception further includes: re-assembling the data packets before transmitting them to the transport layer 1.

Optionally processing at the transport layer 2 is performed on first sub-layer protocol entities and a second sub-layer protocol entity, wherein the first sub-layer protocol entities receive the data packets processed by the second sub-layer protocol entity, and the second sub-layer protocol entity receives the data packets transmitted from the physical layer, so the data packets are re-assembled as follows:

the second sub-layer protocol entity processes data packets of different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets.

Optionally re-assembling the data packets includes:

de-packaging data packets of each logic channel into different PDUs or PDU segments to be processed at the transport layer 1, under a packaging rule; and if the data packets are de-packaged into PDUs, then passing the PDUs to the transport layer 1 for processing, or if the data packets are de-packaged into PDU segments, then if the transport layer 1 is configured with a PDU segmentation function, then passing the PDU segments to the transport layer 1 for processing; otherwise, composing the PDU segments into PDUs, and then passing the PDUs to the transport layer 1 for processing.

Optionally processing at the transport layer 1 during reception further includes:

after the data packets are reordered according to their SNs, feeding back an incorrectly received data packet, and inversely security-processing and header-decompressing correctly received data packets into the transmission data packets.

Optionally processing at the transport layer 1 during reception further includes:

defining a reception window, maintaining the reception window, and receiving and/or reordering the data packets in the reception window, wherein the data packets are reordered as follows:

when the data packets are received out of order, a reordering timer is started, and the highest SN in a reception queue at this time is recorded;

before the reordering timer expires, if the data packets are not received out of order, then the reordering timer will be stopped; otherwise, the reordering timer will be restarted, and the highest SN in the current reception queue will be recorded; and if the reordering timer expires, then if a PDU corresponding to some SN preceding to the recorded SN corresponding to the reordering timer has not been received, then it will be determined that the data packet fails to be transmitted.

Optionally processing at the transport layer 1 during transmission in the AM mode further includes at least one of followings:

defining a reception window, maintaining the reception window, and receiving the data packets in the reception window; and when data lying into the reception window are received, if there is a gap in a reception sequence, then starting a reordering timer, and if the data packet has not been received after the reordering timer expires, then determining that the data fail to be transmitted, and feeding a status report back to the receiver.

Advantageous effects of the invention area as follows:

In the data transmitting solutions according to the embodiments of the invention, the data being transmitted are processed at two layers, and the centralized protocol layers perform various operations under the conditions of different links, so the data can be transmitted efficiently at a shorter delay, thus improving the efficiency of the system, and a user experience.

BRIEF DESCRIPTION OF THE DRAWINGS

The drawings here are intended to provide further understanding of the invention, and constitute a part of the invention, and the exemplary embodiments of the invention, and the description thereof are intended to set forth the invention, but not to limit the invention unduly.

DETAILED DESCRIPTION OF THE EMBODIMENTS

Figure 1:
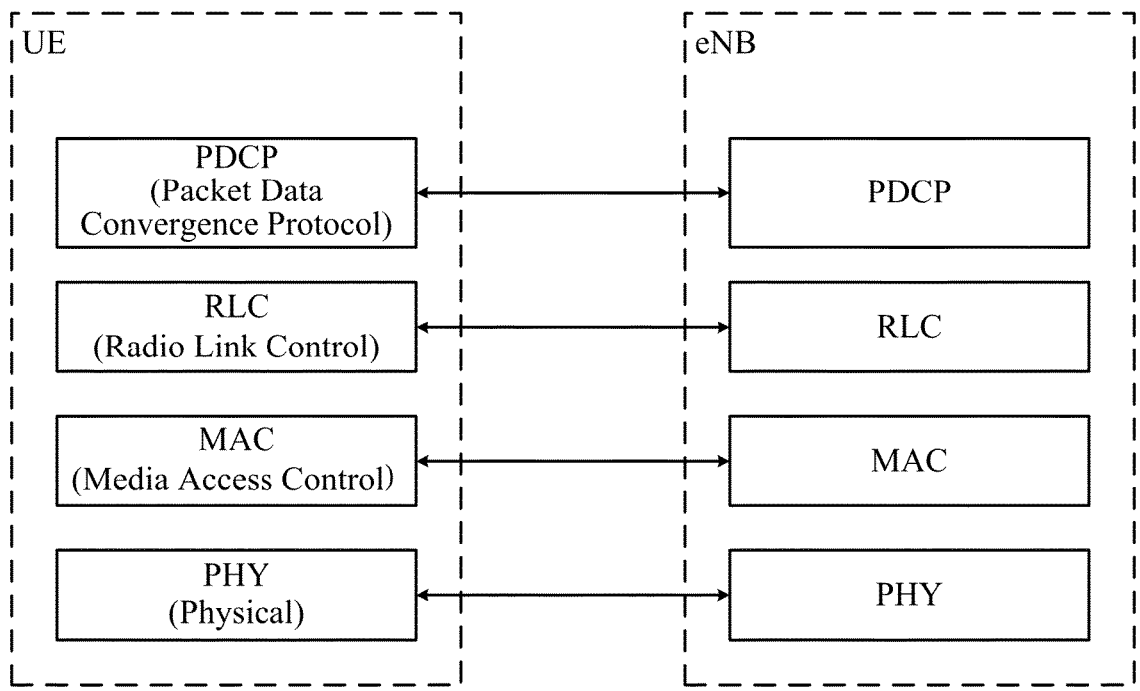
FIG. 1 is a schematic diagram of a user-plane protocol stack in the prior art.
Figure 2:
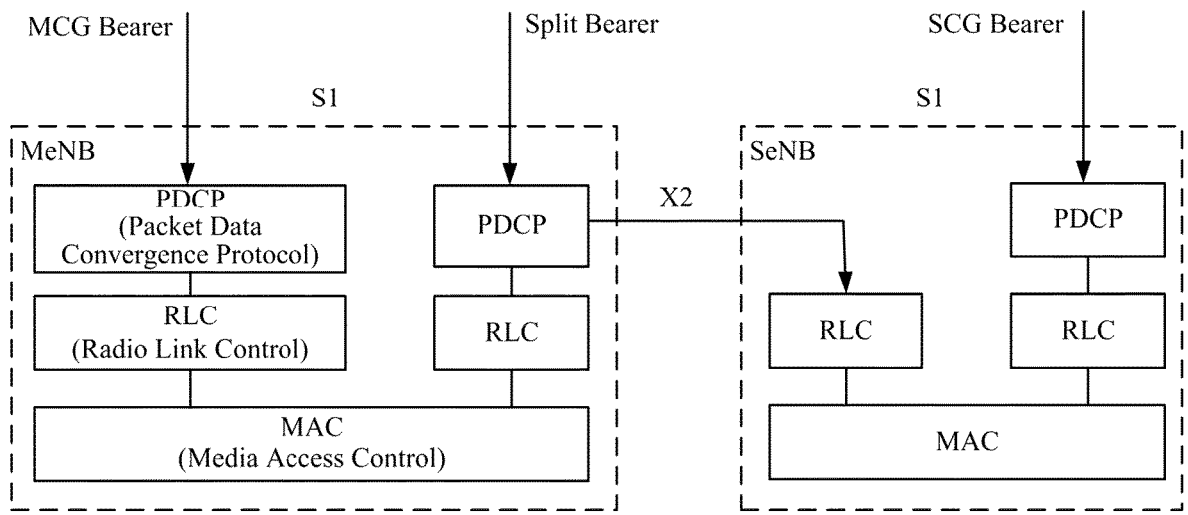
FIG. 2 is a schematic diagram of a radio protocol architecture for dual connectivity in the prior art.
Figure 3:
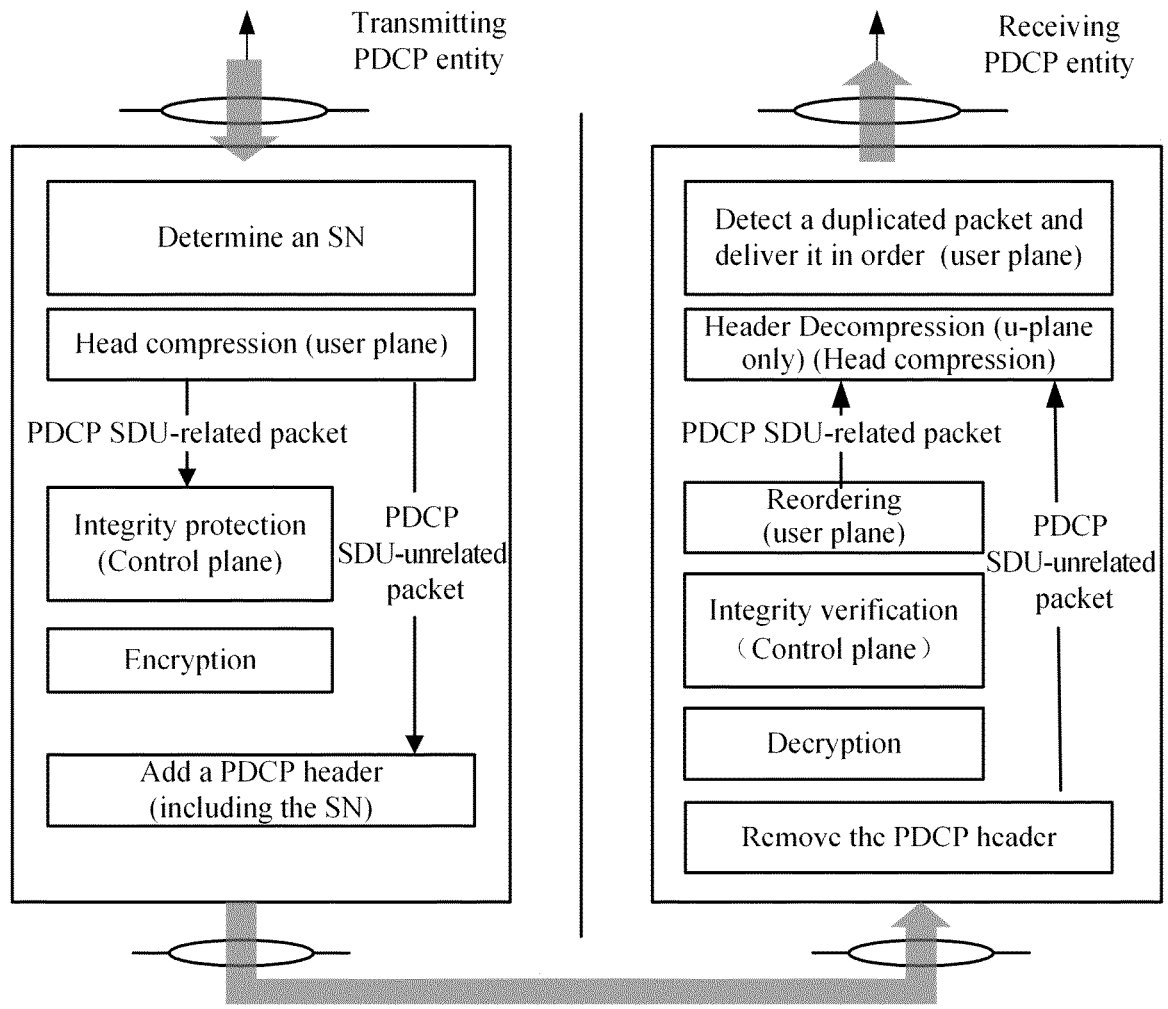
FIG. 3 is a schematic diagram of a flow of processing data at the PDCP layer in the prior art.
Figure 4:
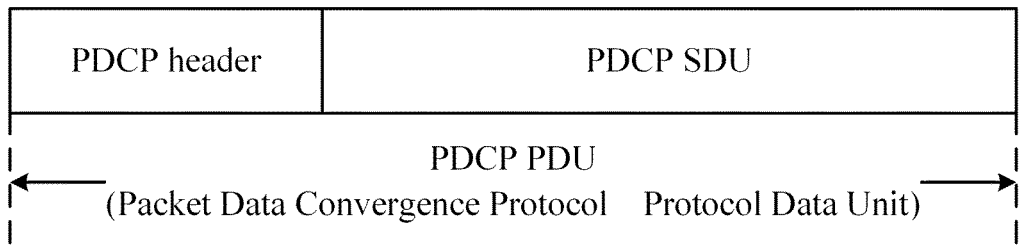
FIG. 4 is a schematic structural diagram of a PDCP PDU in the prior art.
Figure 5:
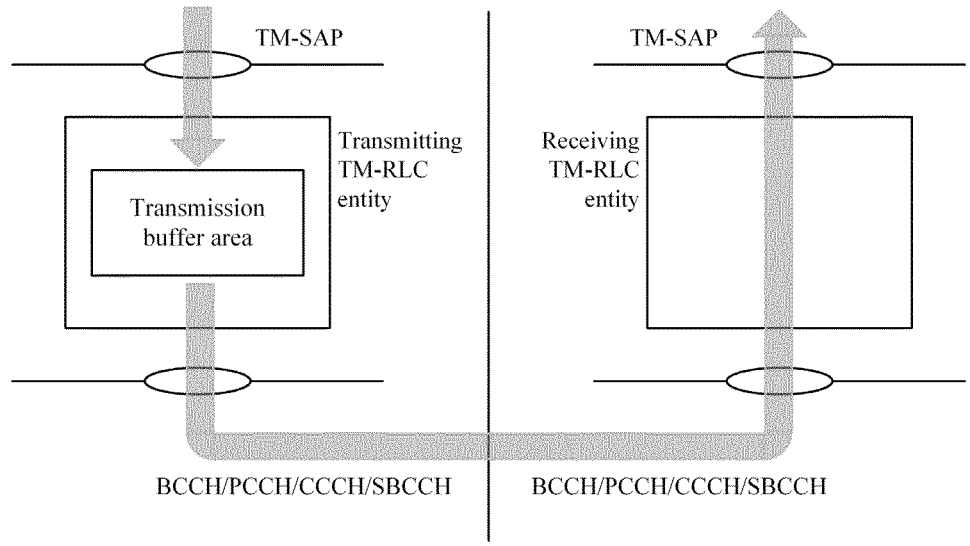
FIG. 5 is a schematic diagram of processing data in the RLC TM mode in the prior art.
Figure 6:
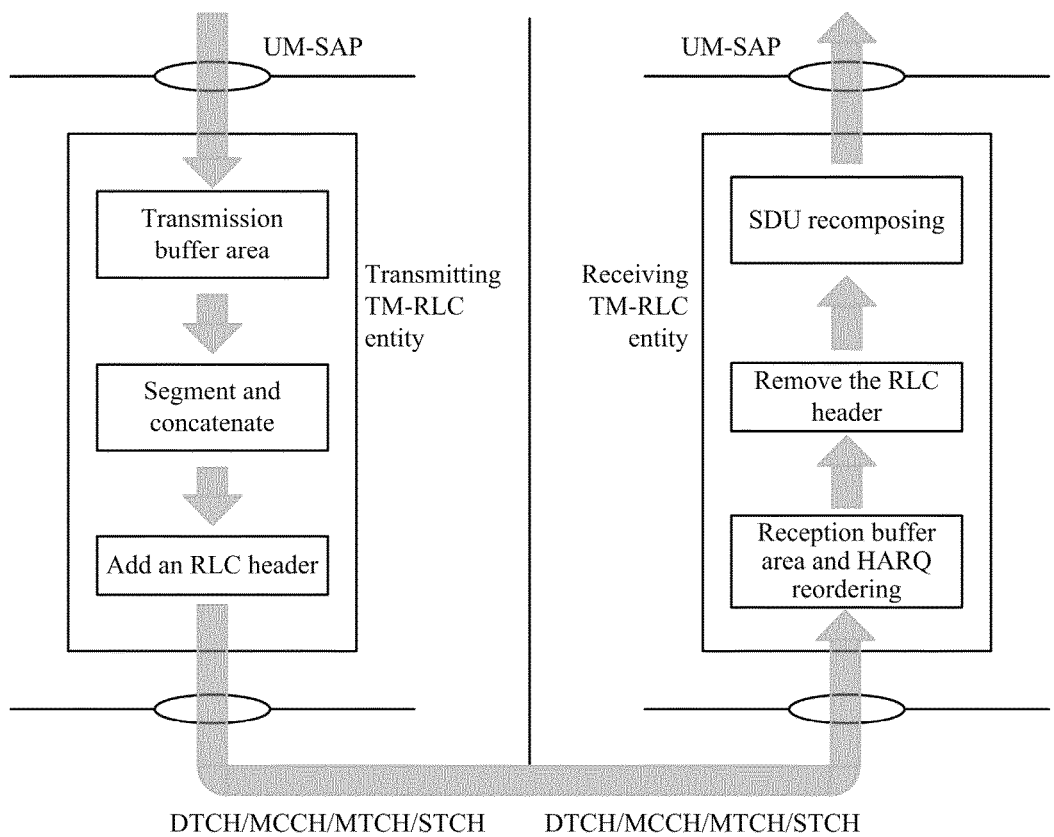
FIG. 6 is a schematic diagram of processing data in the RLC UM mode in the prior art.
Figure 7:
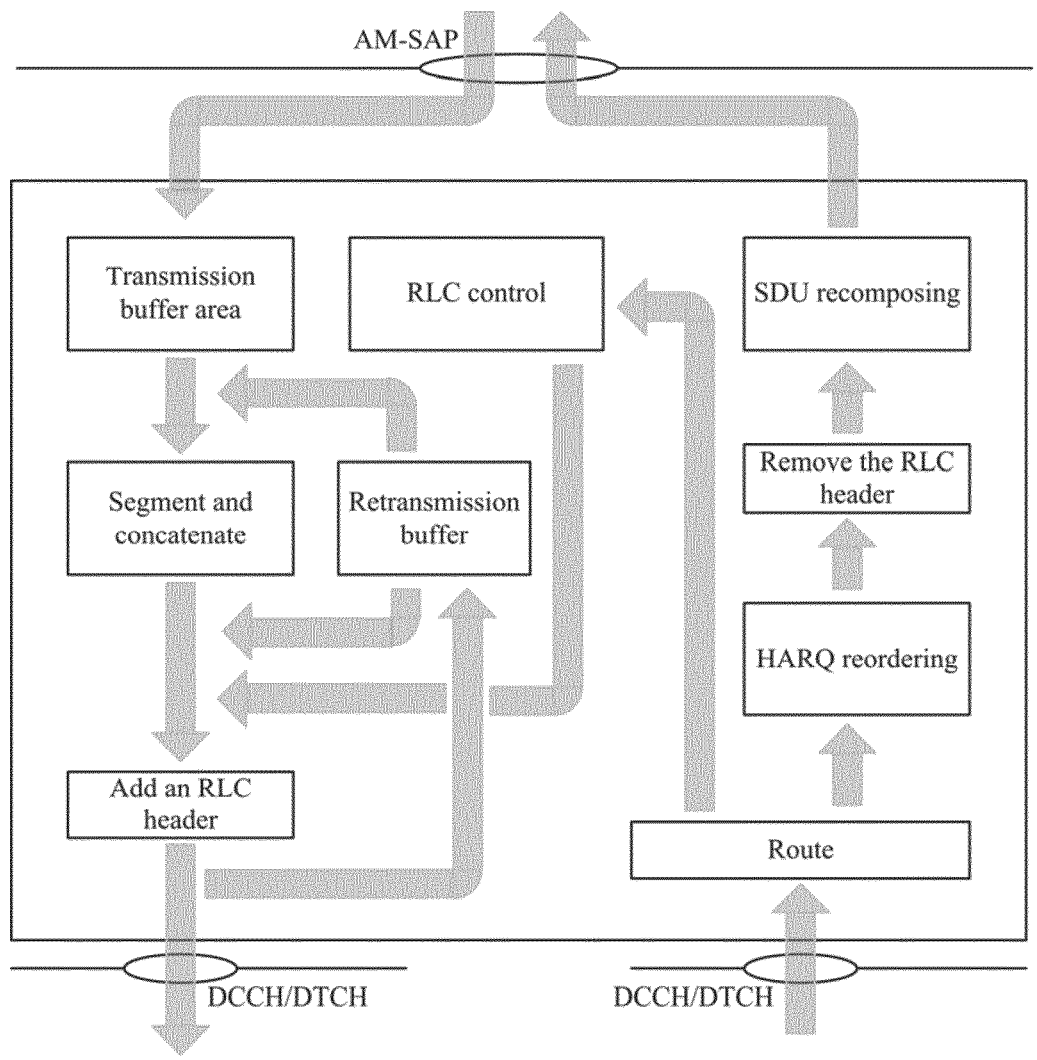
FIG. 7 is a schematic diagram of processing data in the RLC AM mode in the prior art.
Figure 8:
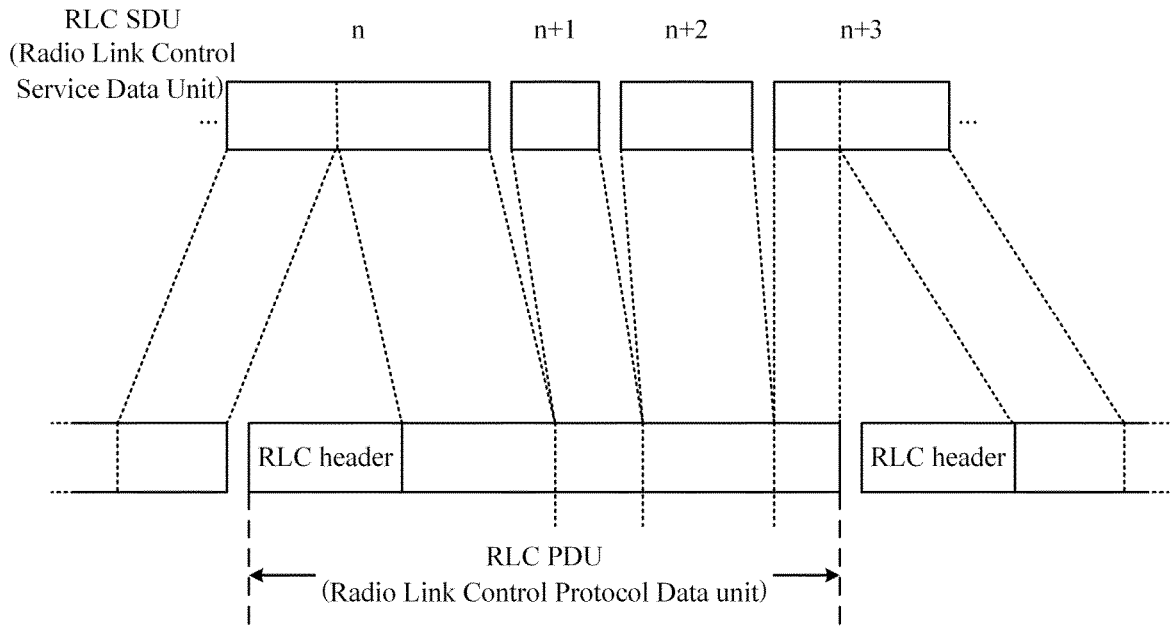
FIG. 8 is a schematic diagram of generating an RLC PDU in the prior art.

The inventors have identified during making of the invention that:

on one hand, in the prior art, the PDCP, RLC, and MAC layers are involved in the layer two protocol, and some functions of the respective layers overlap with each other; and for example, both the PDCP layer and the RLC layer allocate an SN and reorder data, both the MAC layer and the RLC layer have the function of concatenating the data, and all the three layers include a header structure, so the functions are redundant, there is a considerable overhead, and processing is complicated and inefficient;

in the other hand, in future development of a mobile communication system, in order to better satisfy a user demand, and to improve the network capacity and throughput significantly, a new air-interface transmission mode, more network nodes, and a sophisticated network topology will be introduced to a 5G network. In the 5G network, there are both a two-layer access network architecture of a central node and distributed nodes, and an architecture in which a node performs all the functions of processing data, so there are a number of scenario in which the architectures coexist and are switched to each other. In these scenarios, a 5G two-layer design will be provided to maximum the efficiency of two-layer data processing, to make a rapid response to and feedback of a link condition, to retransmit data efficiently, and to guarantee a Quality of Service (QoS) required of data transmission.

Stated otherwise, there will be a higher 5G data rate, and if the existing two-layer design is still applied, then there will be a great challenge to real-time operations and transmission efficiency, thus hindering the efficiency of the network as a whole, and a user experience from being improved.

Hereupon the embodiments of the invention provide such a new function of processing data that relates to processing of two-layer data, is applicable to various scenarios, guarantees the transmission efficiency, improve the experience of a user, and facilitate an improvement in network efficiency of a future network.

Particularly in the technical solutions according to the embodiments of the invention, when higher-layer data packets (e.g., Radio Resource Control (RRC) signaling, or user data packets of a UE) arrives, they are stored into a transmission buffer, and thereafter SNs are firstly allocated for the data packets at an L2 higher, and then data in a transmit window are header-compressed and security-processed (integrity protection, encryption, etc.) according to a window requirement corresponding to a transmission mode, whether to segment the data is decided according to a configuration, and the data are transmitted to an L2 low layer of a lower layer.

An L2 high layer may correspond to one or more L2 low layer, and when there are a plurality of L2 low layers, the respective L2 low layers can be located at different Transmission and Reception Points (TRPs). Data packets transmitted by the L2 high layer to the respective L2 low layers may be different, or may be the same. If the data packets are different, then the plurality of TRPs will transmit different data of the same bearer respectively, and their traffic will be aggregated. If the data packets are the same, then the plurality of TRPs will transmit the same data, thus improving the probability that the data are correct, and guaranteeing a short transmission delay and high reliability.

The L2 lower layer stores the higher-layer data packets into a transmission buffer upon reception thereof, segments and concatenates the data packets according to the size of a scheduled transmission resource, passes them to the physical layer, which transmits them to an opposite end via an air interface.

The physical layer of the counterpart end passes the data to an L2 low layer upon reception thereof, the L2 low layer firstly re-assembles the data, and transmits resulting L2 high layer data. PDUs or PDU segments to a high layer, and the high layer reorders the data according to their SNs, determines a packet loss according to a discontinuity in a reception sequence determined in the AM mode after the data are reordered, composes a status report according to the packet loss and a correct reception condition, sends the status report to the counterpart end, and waits for retransmission from the counterpart end. The high layer inversely security-processed, header-decompresses, etc., the data packets received in a correct sequence into the higher-layer data packets, and then delivers them to the higher layer.

It shall be noted that the concepts of an L2 high layer, an L2 low layer, etc., will be described in the following embodiments, and their functions will not be simply equivalent to similarly expressed technical terms in the prior art.

Particular implementations of the invention will be described below with reference to the drawings.

In the following description; implementations at a transmitter and a receiver will be described respectively, and then examples of the implementations will be further described for better understanding of the implementations of the solutions according to the embodiments of the invention. Such a description will not suggest that both of them shall cooperate in an implementation, or shall operate separately in an implementation, and in fact, respective problems of the transmitter and the receiver can also be addressed when they operate separately in an implementation, although a better technical effect can be achieved when they cooperate in an implementation.

Figure 9:
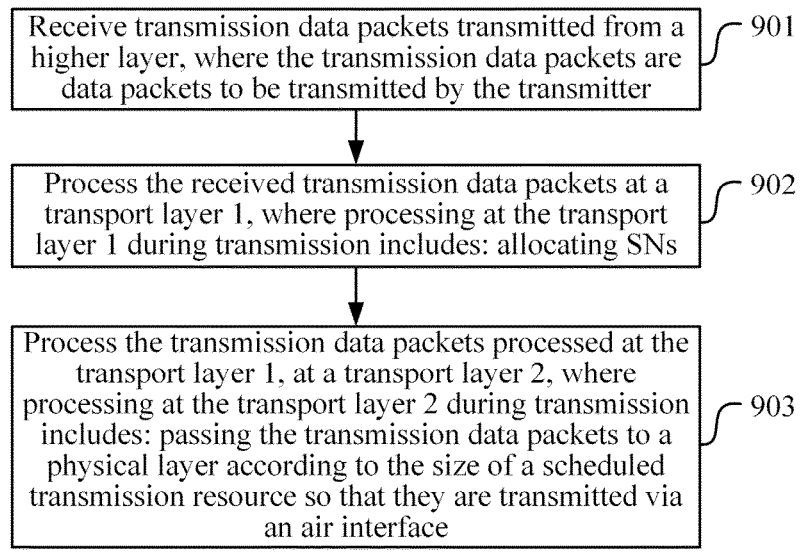
FIG. 9 is a schematic flow chart of a method for processing data at the data transmitter side according to an embodiment of the invention.

FIG. 9 is a schematic flow chart of a method for processing data at the data transmitter side, and as illustrated, the method can include:

the step 901 is to receive transmission data packets transmitted from a higher layer, where the transmission data packets are data packets to be transmitted by the transmitter;

the step 902 is to process the received transmission data packets at a transport layer 1, where processing at the transport layer 1 during transmission includes: allocating SNs; and the step 903 is to process the transmission data packets processed at the transport layer 1, at a transport layer 2, where processing at the transport layer 2 during transmission includes: passing the transmission data packets to a physical layer according to the size of a scheduled transmission resource so that they are transmitted via an air interface.

Figure 10:
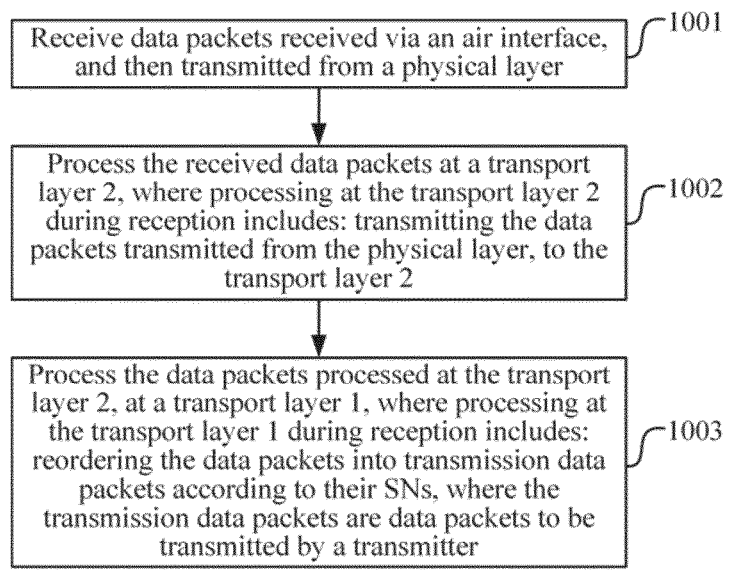
FIG. 10 is a schematic flow chart of a method for processing data at the data receiver side according to an embodiment of the invention.

Correspondingly at the data receiver side:

FIG. 10 is a schematic flow chart of a method for processing data at the data receiver side, and as illustrated, the method can include:

the step 1001 is to receive data packets received via an air interface, and then transmitted from a physical layer;

the step 1002 is to process the received data packets at a transport layer 2, where processing at the transport layer 2 during reception includes: transmitting the data packets transmitted from the physical layer, to the transport layer 2; and the step 1003 is to process the data packets processed at the transport layer 2, at a transport layer 1, where processing at the transport layer 1 during reception includes: reordering the data packets into transmission data packets according to their SNs, where the transmission data packets are data packets to be transmitted by a transmitter.

Firstly, concepts will be described below.

Figure 11:
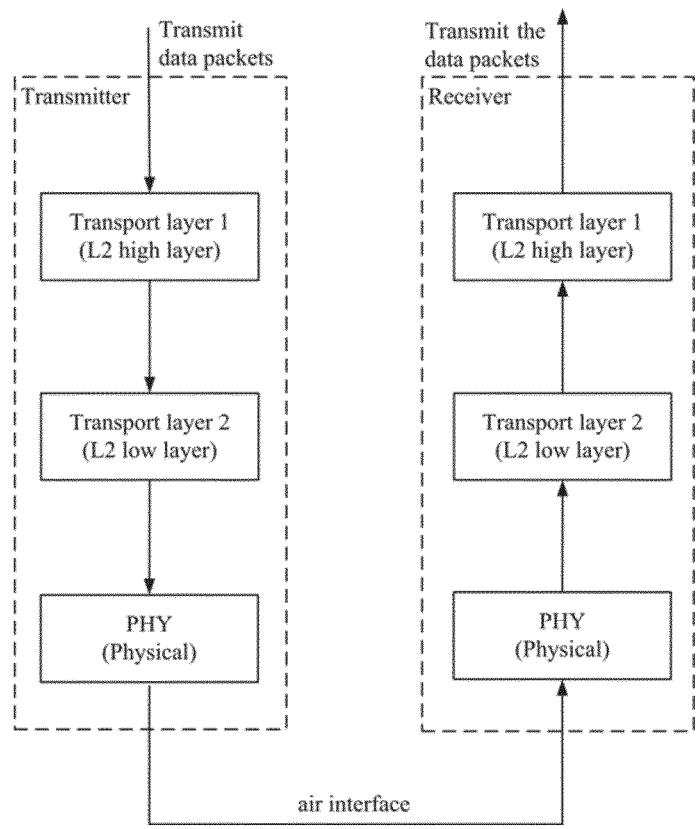
FIG. 11 is a schematic diagram of a protocol stack according to an embodiment of the invention.

FIG. 11 is a schematic diagram of a protocol stack, and as illustrated, a transmitter to transmit data packets transmits the data packets to a higher layer, then processes the data packets at a transport layer 1, then passes them to a transport layer 2 for processing, and then passes the processed data packets to a physical layer for transmission via an air interface; and correspondingly a receiver receives the data packets received via the air interface, and then transmitted from a physical layer, then transmits the received data packets to a transport layer 2 for processing, then passes them to a transport layer 1, and processes them into the transmission data packets, i.e., the data packets to be transmitted by the transmitter. In the embodiments of the invention, the transport layer 1 may also be referred to as an L2 high layer, and the transport layer 2 may also be referred to as an L2 low layer, so they can be referred differently to for a better representation of technical meaning of the protocol stack.

Figure 12:
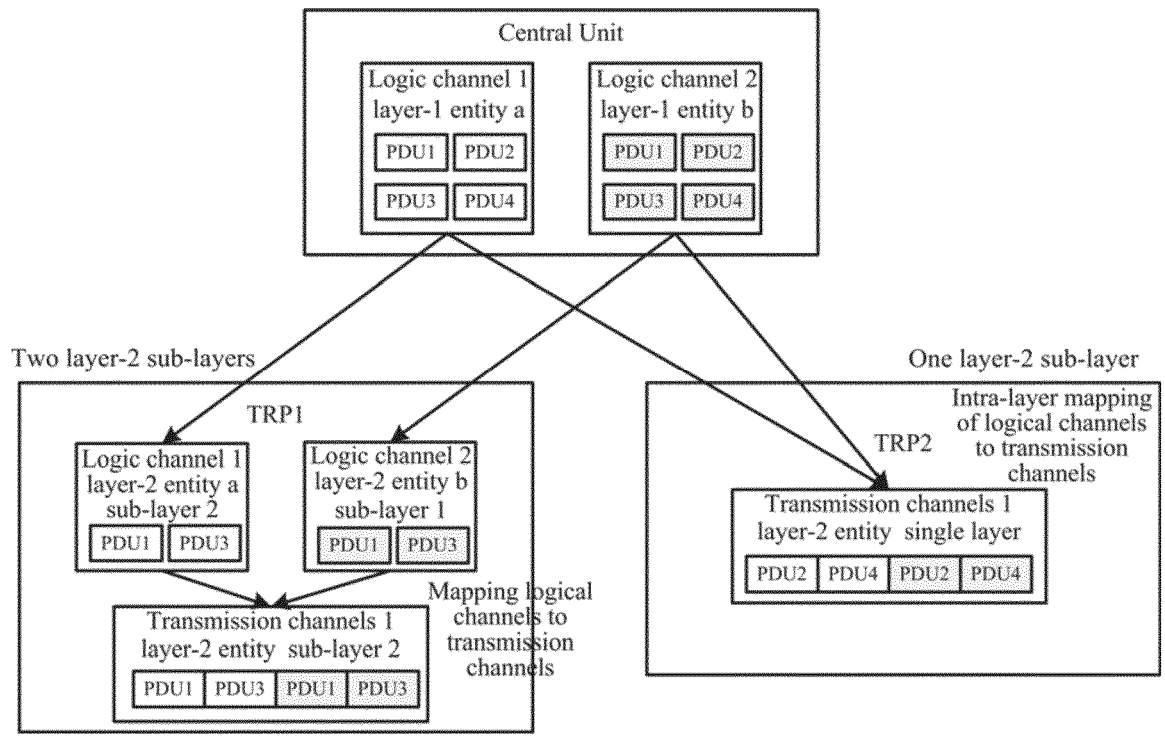
FIG. 12 is a schematic diagram of transmitting a data packet between a transport layer 1 and a transport layer 2 according to an embodiment of the invention.

FIG. 12 is a schematic diagram of transmitting a data packet between a transport layer 1 and a transport layer 2, and as illustrated in FIG. 12, the transport layer 1 may correspond to one or more transport layers 2. This will also be described below in details in particular implementations by way of an example.

In an implementation, processing at the transport layer 1 can be performed on a logic entity; and processing at the transport layer 2 can be performed on one or at least two logic entities.

In a particular implementation, when processing at the transport layer 2 is performed on at least two logic entities, the logic entity performing processing at the transport layer 1 distributes the processed data packets to at least one of the two logic entities performing processing at the transport layer 2; or a logic entity performing processing at the transport layer 1 duplicates and then distributes the processed data packets to the at least two logic entities performing processing at the transport layer 2.

Particularly, data of the same logic channel can be split onto different transport layers 2 for processing, or can be duplicated and then processed. For example, there are data packets 1 to 6 of a logic channel to be transmitted, and two lower layers 2, so the data can be allocated to the two layers 2 as follows:

the data packets 1, 3, and 5 are allocated to the first layer 2 for transmission; and the data packets 2, 4, and 6 are allocated to the second layer 2 for transmission.

Alternatively they can be allocated as follows:

the data packets 1 to 6 are allocated to the first layer 2 for transmission; and the data packets 1 to 6 are also allocated to the second layer 2 for transmission.

In a particular implementation, when processing at the transport layer 2 is performed on at least two logic entities, the flow further includes:

when the data packets are retransmitted, they are retransmitted to a logic entity originally performing processing at the transport layer 2, or the other logic entity performing processing at the transport layer 2.

Particularly, a logic channel is not changed, and the logic channel corresponds uniquely to a transport layer 1 entity, but a transport layer 2 entity is changed, and a different transport layer 2 entity can be selected for transmission; and when a layer 2 entity is selected for retransmission:

PDUs or segments to be transmitted are transmitted by a first transport layer 2 entity; and the PDUs or the segments to be transmitted are also transmitted by a second transport layer 2 entity; or PDUs to be transmitted are segmented:

a segment 1 is transmitted by the first layer 2 entity; and a segment 2 is transmitted by the second layer 2 entity.

In an implementation, segments of the data packets can be initially transmitted or retransmitted, that is, the data segments can be segmented for both initial transmission and retransmission, or can be segmented for only initial transmission or retransmission, but the segments for initial transmission may not necessarily be related to the segments for retransmission, so processing at the transport layer 1 during transmission can further include:

whether to segment the data packets to be initially transmitted, at the transport layer 1 is decided according to a configuration, and/or whether to segment the data packets to be retransmitted, at the transport layer 1 is decided according to a configuration, and if so, then the transmission data packets segmented at the transport layer 1 are passed to the transport layer 2 for processing, where the configuration for initial transmission of the data packets is the same as or different from the configuration for retransmission of the data packets.

At the receiver, in an implementation, processing at the transport layer 2 during reception can further include: re-assembling the data packets before transmitting them to the transport layer 1.

In an implementation, processing at the transport layer 1 during reception can further include:

after the data packets are reordered according to their SNs, an incorrectly received data packet is fed back, and correctly received data packets are inversely security-processed and header-decompressed into the transmission data packets.

Further implementations on the receiver will be further described below in particular implementations by way of an example.

The implementations of the transmitter and the receiver will be described below by way of an example.

First Embodiment a particular implementation of an L2 high layer transmitter in the UM mode will be described in this embodiment.

The UM mode is an unacknowledged mode, and refers to a scenario in which an L2 high receiver does not transmit any status report of a data reception condition, so a transmitter does not retransmit any data.

In the UM mode, a process of transmitting L2 high layer data by the transmitter can generally be as follows.

1. The L2 high layer transmitter receives data from a higher layer thereof, and stores the data into a transmission buffer as L2 high layer SDUs; and the data may or may not be stored into the transmission buffer, that is, the SDUs can be processed directly, or can be stored in the buffer for subsequent processing.

2. The L2 high layer firstly allocates SNs for the higher-layer SDUs, and in a particular implementation, for example, an initial sequence number value of an SN is 0, and respective SNs are allocated in sequence by incrementing their preceding SNs by one; and the length of an SN is configurable, and for example, can be configured as 10 bits, 15 bits, 18 bits, etc., to represent SN ranges [0, 1023], [0, 32767], and [0, 262143] respectively.

In an implementation, after the SNs are allocated, the flow can further include:

a Discard timer is started according to a delay configuration in QCI. Particularly the Discard timer can be started for the higher-layer SDUs according to the configuration, and this timer is configured as needed for a service, and generally equal to the longest transmission delay bearable to the service, and related to the delay configuration in the QoS Class Indicator (QCI), e.g., 300 ms, 1.5 s, etc.

After the SNs are allocated, the data can be transmitted in a configured transmission mode, and if the transmission mode is the UM, then the data may be transmitted directly.

3. Processing at the transport layer 1 can further include: header-compressing the data after the SNs are allocated.

Particularly, the SDUs are header-compressed as necessary according to a configuration. Whether to enable header compression is configurable, and generally RRC signaling and other data packets than IP data packets are not header-compressed; and header compression can be configured for data packets satisfying a head compression condition, and a head compression algorithm and parameters can be configured via RRC signaling before the data are transmitted, where the data are processed according to the configuration, and thereafter the flow proceeds to the next step, that is, in an implementation, the data can be header-compressed via RRC signaling in the UM mode.

4. Processing at the transport layer 1 can further include: security-processing the data.

Particularly, the data above can be further security-processed according to a configuration, and security processing generally includes integrity protection and encryption; and higher-layer signaling, e.g., RRC signaling and Non Access Stratum (NAS) signaling is generally both integrity-protected and encrypted, and user data is generally only encrypted.

5. Processing at the transport layer 1 can further include: after the data are header-compressed and security-processed, whether to segment the data at the transport layer 1 is decided according to a configuration, and if so, then the data packets segmented at the transport layer 1 will be passed to the transport layer 2 for processing. Of course, if the data are not header-compressed and security-processed, then the data will be segmented directly at the transport layer 1.

Particularly. PDUs are composed, header SN fields and other fields are added thereto, and whether to segment the data in advance is decided according to a configuration; and the segmentation here is optional, this function may be omitted or may be configurable, and whether to enable an L2 high layer segmentation function can be configured via RRC signaling, that is, whether to segment the data can alternatively be configured dynamically via. RRC signaling in the UM mode.

How to segment the data can be configured dynamically via RRC signaling, or can be decided dynamically under a particular transmission condition. The data can be segmented as per a number of bytes, and for example, a segment includes 500 bytes; or the data can be segmented into a number of segments, and for example, an IP packet in 1500 bytes is segmented into three segments.

Finally the L2 high layer PDUs formed as described above is passed to an L2 low layer.

Here if the L2 high layer corresponds to the L2 low layer in a one-to-one manner, then the PDUs will be transmitted directly. If the L2 high layer corresponds to a plurality of L2 low layers, then corresponding one of the L2 low layers may be selected according to a configuration, and transmission conditions of respective links.

If two or more L2 low layers are configured via. RRC signaling to transmit duplicate data, then the L2 higher layer will transmit the same data to all of these several configured L2 low layers; and if data are split onto a plurality of L2 low layers, then the L2 high layer will select corresponding one of the L2 low layers for each data PDU, and generally an L2 low layer with a lower load and a higher link quality will be selected to transmit the data as rapidly as possible.

Second Embodiment a particular implementation of an L2 low layer transmitter in the U mode will be described in this embodiment.

A process of transmitting data at a transmitter L2 low layer can be generally as follows.

1. The L2 low layer receives data from an L2 high layer, and stores the data into a transmission buffer.

2. Processing at the transport layer 2 can further include: segmenting and concatenating the transmission data packets before passing them to the physical layer.

Particularly, the data can be packaged according to the size of a scheduled transmission resource, and the same L2 high layer data can be segmented and concatenated, or different L2 high layer data can be concatenated.

Here there may be the following two implementations at each L2 low layer.

In a first implementation, the data are segmented and concatenated by identifying the transmission data packets to identify the logic channels from which the transmission data packets are.

Furthermore, alternatively the data can be segmented by identifying the data packets using their SNs, or the data can be segmented according to payloads of the data packets processed at the transport layer 1.

Particularly, the L2 low layer is embodied as a protocol entity or entities at the same layer to perform the entire process of scheduling, mapping, and packaging from a logic channel to a transmission channel. Stated otherwise, an L2 high layer can be mapped to an L2 low layer in such a way that an L2 higher layer is mapped to a plurality of L2 low layers because these L2 low layers can be located at different TRP nodes to serve a UE together, and a plurality of L2 high layers are mapped to an L2 low layer because data of different logic channels are mapped onto the same transmission channel.

In this implementation, the L2 low layer can compose PDUs by carrying logic channel information in a header to distinguish data blocks from different logic channels from each other.

The data can be further segmented and concatenated as appropriate over each logic channel to be adapted to the size of a transmission resource, and the original data to be packaged are PDUs or PDU segments of the L2 high layer, and carry SN information of the PDUs; and the data can be packaged at the L2 low layer by identifying each data block using the SN information, and the length of each data block to be concatenated shall be indicated so that a receiver can re-assemble them correctly. For each segment, it shall be also indicated that this is a segment, and the segment can be indicated in at least the following two schemes:

In a scheme, the position of a segment in the original PDU is carried, and for example, the original PDU includes 1000 bytes, and some segment includes the $300^{th}$ to $1000^{th}$ bytes, so the start position of the segment is represented as 300, the all-1 position is set to indicate that the PDU ends with the segment, and length information of the segment is further carried, which is 700 bytes; and in the other scheme, the segment number of a segment is carried, and for example, a segment layer is represented in four bits (0 to 15), where 0 represents the first segment, 1 represents the second segment, . . . , 14 represents the fifteenth segment, and the special numeral 15 represents an ending segment.

In a second implementation, processing at the transport layer 2 is performed by a first sub-layer protocol entity and a second sub-layer protocol entity, where the first sub-layer protocol entity receives the data packets processed at the transport layer 1, and the second sub-layer protocol entity receives the data packets processed by the first sub-layer protocol entity, so the data are segmented and concatenated as follows according to the size of a scheduled transmission resource:

the second sub-layer protocol entity informs the first sub-layer protocol entity of a size of the data packets after finishing a schedule;

the first sub-layer protocol entity segments and concatenates the data packets processed at the transport layer 1; and the second sub-layer protocol entity receives the data packets segmented and concatenated by the first sub-layer protocol entity; and then adds identification information to the data packets from different logic channels, multiplexes the data packets of the different logic channels into transmission channel data packets, and transmits them to the physical layer.

Particularly, the L2 low layer can be embodied as two sub-layers, where a sub-layer 1 connected directly with the L2 high layer packages logic channels, and the other sub-layer 2 connected with the physical layer multiplexes the logic channel into a transmission channel, and performs possible HARQ, scheduling, and other operations. In this architecture, the L2 high layer, the L2 low layer 1, the L2 low layer 2, and the physical layer are involved in the layer two protocol in that order.

In this implementation, the L2 low layer 2 schedules the data, and then informs the L2 lower layer 1 of the size of a packet, and then the L2 low layer 1 segments and concatenates as appropriate the PDUs of the high layer to adapt to this size.

The L2 low layer receives the data packets of the L2 low layer 1, and then adds logical channel information, length indication information, etc., to the data packets from the different logic channels; multiplexes the data of the different logic channels into transmission channel PDUs, and then transmits them to the physical layer.

Third Embodiment a particular implementation of an L2 low layer receiver in the UM mode will be described in this embodiment.

In the UM mode, a process of processing data at a receiver L2 low layer can be generally as follows.

The L2 low layer receives data packets from the physical layer, and de-packages the data packet.

Firstly, they are parsed for data packets of different logic channels, and the data packets of the different logic channels are processed respectively; and if the L2 low layer is embodied as two sub-layers; then the logic channel packets will be de-packaged at an L2 low layer 2, and thereafter the data packets of each logic channel will be transmitted to a corresponding low layer 1 for processing.

Stated otherwise, in the UM mode, processing at the transport layer 2 can be performed by first sub-layer protocol entities and a second sub-layer protocol entity, where the first sub-layer protocol entities receive the data packets processed by the second sub-layer protocol entity, and the second sub-layer protocol entity receives the data packets transmitted from the physical layer; so the data packets are re-assembled as follows:

the second sub-layer protocol entity processes the data packets of the different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets.

Secondly, the data packets of each logic channel are de-packaged into different PDUs or PDU segments of the L2 high layer under the packaging rule, and if the data packets are de-packaged into PDUs, then the PDUs will be transmitted directly to the L2 high layer; and if the data packets are de-packaged into PDU segments of the L2 high layer, then if the L2 high layer is configured with a PDU segmentation function, then the L2 low layer may transmit the PDU segments directly thereto; otherwise, it will indicate that the PDUs are segmented at an L2 low layer transmitter, so the L2 low layer receiver shall compose the PDU segments into the PDUs, and then transmit them to the L2 high layer. At least one possible implementation thereof is as follows:

the L2 low layer stores some segments of the PDUs, and packages the subsequently received PDU segments with the PDU segments in the buffer, and if they can be composed into integral PDUs, then the L2 lower will transmit them to the L2 high layer.

Some timer is set for the buffered segments, where the timer can be configured via RRC signaling, and the length thereof is generally determined as the product of the number of HARQ retransmissions, and an HARQ Round Trip Time (RTT); when a PDU segment enters the buffer, the timer is started; and after the timer expires, if the PDU segment has not been packaged into an integral PDU transmitted to the higher layer, then it will indicate that a part of segments of the PDU fail to be transmitted, and at this time, the PDU segments in the buffer will be deleted instead of waiting.

Stated otherwise, the data packets can be re-assembled in the UM mode as follows:

data packets of each logic channel are de-packaged into different PDUs or PDU segments to be processed at the transport layer 1, under the packaging rule; and if the data packets are de-packaged into PDUs, then the PDUs will be passed to the transport layer 1 for processing, or if the data packets are de-packaged into PDU segments, then if the transport layer 1 is configured with a PDU segmentation function, then the PDU segments will be passed to the transport layer 1 for processing; otherwise, then the PDU segments will be composed into PDUs, and then them will be passed to the transport layer 1 for processing.

Fourth Embodiment a particular implementation of an L2 high layer receiver in the UM ode will be described in this embodiment.

In the UM mode, a process of processing data at a receiver L2 high layer can be generally as follows:

in the UM mode, processing at the transport layer 1 during transmission can further include: defining a reception window, maintaining the reception window, and receiving and/or reordering the data packets in the reception window.

In an implementation, the reception window can be defined at least as follows:

PDUs transmitted from the L2 low layer are received, and it is determined whether the PDUs are data in the reception window, where the reception window is defined as [Lower Bound, Upper Bound), where the upper bound is the highest received SN plus 1, and the lower bound is the upper bound minus the size of the reception window; and the size of the reception window is generally a half of the size of an SN space. For example, if an SN is represented in ten bits, then a half of the size of an SN space will be $2^{10}/2=512$. If a received SN lies out of the reception window, then the upper bound will be updated to the SN plus 1, and if the received SN lies into the reception window, then it will be determined as a duplicated packet, or a data packet to fill up a reception gap, where the duplicated packet shall be deleted, and the packet to fill up the reception gap is received and reordered.

If the PDUs are consecutive PDUs in sequence, then subsequent operations will be performed on the PDUs as follows:

headers are removed;

they are decrypted and integrity-de-protected;

they are header-decompressed; and higher-layer SDU are recovered and then delivered to the higher layer in order.

In an implementation, the PDUs can be reordered as follows:

when the PDUs are received out of order; a reordering timer is started, and the highest SN in a reception queue at this time is recorded;

before the reordering timer expires, if the PDUs are not received out of order, then the reordering timer will be stopped; otherwise; the reordering timer will be restarted, and the highest SN in the current reception queue will be recorded; and if the reordering timer expires, then if a PDU corresponding to some SN preceding to the recorded SN corresponding to the reordering timer has not been received, then it will be determined that the data packet fails to be transmitted.

Particularly, if there is a reception gap among the SNs of the PDUs, then it will indicate that there are intermediate data absent or appearing out of order, possibly due to different numbers of HARQ retransmissions, or different scheduling and transmission paths of different TRPs, and at this time, the receiver needs to reorder the PDUs in the following operations:

when the PDUs are received out of order; that is, there is a gap appearing among them (possibly due to an absent integral PDU or PDU segment corresponding to some SN), then the reordering timer will be started, and the highest SN in the reception queue at this time will be recorded;

before the reordering timer expires, if all the gaps preceding to the recorded SN corresponding to the reordering timer have been filled up, then it will indicate that the PDUs are reordered successfully, and at this time, if there is not any other gap, then the reordering timer will be stopped; or if there is still a new gap, then the reordering timer will be restarted, and the highest SN in the current reception queue will be recorded; and if the reordering timer expires, then if a PDU corresponding to some SN preceding to the recorded SN corresponding to the reordering timer expires has not been received, then it will be determined that the data packet absolutely fails to be transmitted, and instead of waiting, subsequent operations will be performed on all the PDUs preceding to the SN in an order of their SNs, and the PDUs will be delivered to the higher layer. If there is still a new gap, then the reordering timer will be reordered, and the highest SN in the current reception queue will be recorded.

In an implementation, if the segmentation function of the L2 high layer is enabled, then PDU segments may be received from the lower layer, so the PDU segments are also reordered as described above, an absent PDU segment shall also be awaited, and when all the segments corresponding to some SN have been received and composed into an integral PDU, then it will be determined that the PDU corresponding to the SN is received, and here the gap will disappear. Stated otherwise, in the UM mode, processing at the transport layer 1 during reception can further include: reordering the PDU segments when a segmentation function at the transport layer 1 is enabled for processing at the transport layer 1.

For segments of a PDU, if segments received in sequence are the bytes 0 to 300, the bytes 200 to 800, and the byte 500 to the end of the original PDU, then a re-assembling entity may also re-assemble them into the integral PDU by combining valid parts of the respective segments into the PDU including the byte 0 to the end, all of which are consecutive. For example, the bytes 0 to 300 taken out of the first segment, the bytes 300 to 800 taken out of the second segment, and the byte 800 to the end taken out of the third segment are joined into the integral PDU, although the embodiment of the invention will not be limited thereto.

Fifth Embodiment a particular implementation of an L2 high layer transmitter in the AM mode will be described in this embodiment.

In a processing flow in the AM mode, a transmission window, polling, status report reception, retransmission, and other functions will be modified or newly added in processing flow in the UM mode above. A repeated description of the flow similar to the UM mode will be omitted here, and reference can be made to the first embodiment for details thereof, but different processing from the UM mode will be highlighted in this embodiment, that is:

in the AM mode, processing at the transport layer 1 during transmission can further include one or a combination of the following processing:

a transmission window is defined, the transmission window is maintained, and data packets are transmitted in the transmission window;

P bits are set in data packets or data packet segments to trigger the receiver to feed back a status report;

the data packets are segmented as configured via signaling of the network side; and the data packets are retransmitted based upon reception status feedback of the counterpart end, or feedback information about processing at the transport layer 2.

A particular implementation thereof will be described below.

A strict lower-bound-driven window updating mechanism is enforced for the transmission window in the AM mode, that is, the transmission window is defined as [Lower Bound, Upper Bound], where the lower bound is defined as the highest one of consecutive SNs, for which positive acknowledgement in an ACK status report of the counterpart end is received, plus 1, the upper bound is defined as the lower bound plus the side of the window, and the size of the window is a half of the size of an SN space. For example, if an SN is represented in ten bits, then the size of the window will be $2^{10}/2=512$. In the AM, a PDU can only be transmitted by transmitting data lying into the transmission window instead of data lying out of the transmission window. The transmission window can only be updated dependent upon ACK feedback in a status report of the counterpart end (the counterpart receiver at the L2 high layer), that is, after the ACK status report is received, the lower bound of the transmission window is updated to the highest one of the SNs correctly received in consecution plus 1, and the upper bound is also updated therewith, so that the size of the transmission window is equal to a half of the size of the SN space all the time.

There is a polling mechanism of the transmitter entity to trigger the receiver to feed back a status report. In the polling mechanism, the transmitter selects a specific bit position in a header of a data PDU. For example, there is a bit P in a high layer PDU, and when the bit P is 0, it indicates a normal data packet, so no further processing is performed; and when the bit P is set to 1, it is indicated that the transmitter needs reception status feedback of the receiver. The transmitter can trigger a polling procedure when the window reaches some threshold, e.g., 50%, 75%, etc., or by setting a bit P at an interval of a configurable number of PDUs/SDUs.

The transmitter entity is further provided with a function to segment a data packet, and this function is configurable via signaling of the network side; and when this function is enabled, the transmitter can segment a high layer data SDU as appropriate, and can allocate different segments to different link low layer entities for transmission, so that on one hand, a delay of data transmission can be shortened, and on the other hand, the granularity of the data can be lowered, and also the data can be subsequently retransmitted more flexibly. A segmentation rule can be configured statically at the network side, and for example, the largest size of each segment can be configured, or the number of segments can be configured; or the segmentation rule can be configured to be somewhat adapted to the size of a data packet. For example, the segmentation rule can be configured so that an IP packet including 1500 bytes is segmented into N segments, an IP packet including more than 1500 bytes is segmented into M segments, and an IP packet including less than 1500 bytes is not segmented. The segmentation rule can alternatively be dynamic so that a segmentation scheme depends upon the current real-time transmission condition. For example, when there is a good link condition, the number of segments can be reduced, or the size of each segment can be increased; and when the link condition is degraded, the number of segments can be increased, or the size of each segment can be reduced. The segmentation scheme can even depend upon the condition of each link so that when the quality of a link 1 is lower, or the load thereof is higher, a smaller segment can be allocated to the link 1 for transmission, and when the quality of a link 2 is higher, or the load thereof is lower, a larger segment can be allocated to the link 2 for transmission.

The transmitter entity can further retransmit a data packet, and a retransmission rule generally depends upon reception status feedback of the counterpart end, or information of an L2 low layer of a lower layer, which will be described below respectively by way of an example.

The receiver may trigger a status report feedback procedure upon reception of data packets carrying the bits P, or detecting a gap in a reception sequence, and carry NACK in a status report to indicate which data packets or data segments are lost, and to request for retransmission thereof. The transmitter receiving such an NACK status report shall retransmit these data PDUs or PDU segments, a loss of which is indicated. They are retransmitted in such a way that if it is indicated that some segment is lost, and the other segments of the integral PDU are received correctly, then only the segment, a loss of which is indicated, may be retransmitted, and for example, if it is indicated that bytes 200 to 500 in a data packet are lost, then those bytes will be retransmitted. A part of segments are lost, and the other segments are received correctly, possibly because the transmitter high layer segments a data PDU, and allocates the segments to different paths for transmission, where some of the segments are transmitted successfully, and the other segments fail to be transmitted; or possibly because the high layer transmits the integral PDU to a link low layer, and the low layer segments the PDU according to the size of a transmission resource, where some of the PDU segments are transmitted successfully, and the other PDU segments fail to be transmitted. If it is indicated that the integral PDU is lost, then the integral PDU will be retransmitted. In the case that the integral PDU is to be retransmitted, the data can also be segmented at the high layer, and distributed to different paths for transmission, thus improving the flexibility and shortening a delay.

In another instance of intra-layer retransmission, when a data PDU or segments of the high layer are transmitted to the low layer for transmission, if the low layer can determine that the data fail to be transmitted, according to a transmission condition of the low layer, then the low layer may report to the high layer that the PDU or segments fails or fail to be transmitted so that the high layer retransmits the data immediately, instead of waiting for the high layer counterpart end to trigger retransmission in response to an NACK status report of the data. The lower layer can receive NACK feedback each time a data packet is transmitted at an underlying layer, for example, in response to an HARQ, and abort the transmission and indicate to the high layer that the data fails to be transmitted, when the number of times that data packet has been retransmitted reaches the largest number of times. Alternatively some link of the low layer is degraded so that a data packet can not be transmitted in a timely manner, so this can be reported to the high layer for the data packet, or the other data packets in the buffer, which have not been transmitted, and accordingly the high layer can schedule these data to another link(s) for retransmission to thereby guarantee the continuity of the data instead of degrading a user experience due to the degraded link.

Sixth Embodiment a particular implementation of an L2 high layer receiver in the AM mode will be described in this embodiment.

In a processing flow in the AM mode, a reception window, polling, a status report, and other functions will be modified or newly added in processing flow in the UM mode above. A repeated description of the flow similar to the UM mode will be omitted in this embodiment, and reference can be made to the fourth embodiment for details thereof, but different processing from the UM mode will be highlighted in this embodiment, that is:

in the AM mode, processing at the transport layer 1 during transmission can further include one or a combination of the following processing:

a reception window is defined, the reception window is maintained, and data packets are received in the reception window.

Particularly, a strict reception window mechanism is enforced at the L2 high layer in the AM mode. A data packet lying out of the reception window is determined as a data packet which is received repeatedly or in vain, and if it is necessary, then the compression state of a header thereof may be updated, and a data portion thereof may be deleted. Only a data packet lying into the reception window is processed normally. The reception window is delimited by a lower bound and an upper bound, where the lower bound is the highest of the SNs of consecutively received data packets plus 1, and the upper bound is the lower bound plus a half of the size of an SN space.

When data lying into the reception window are received, if there is a gap in a reception sequence, then a reordering timer will be started, and if the data packet has not been received after the reordering timer expires, then it will be determined that the data fail to be transmitted, and a status report will be fed back to the receiver.

Particularly, the receiver is also provided with a reordering function in the AM mode like the UM mode. When data lying into the reception window are received, if the data are received inconsecutively, and there is a gap in a reception sequence, and for example, if a data packet with the SN of 3 has been received, and a data packet with the SN of 5 is received at present, then a data packet 4 may be determined as a gap in a reception sequence, and a reordering timer may be started for the gap in the reception sequence. If the data packet has not been received after the reordering timer expires, then it will be determined that the data fail to be transmitted, and an NACK status report will be fed back to the receiver to indicate that the data packet is lost. When PDU segments are received, the PDU segments are also reordered, and if some segment has not been received after the reordering timer expires, then it will be determined that the segment is lost, and it will be indicated in an NACK status report that the data packet segment is lost.

Based upon the same inventive idea, an embodiment of the invention further provides an apparatus for processing data, and since the apparatus addresses the problem under a similar principle to the method for processing data, reference can be made to the implementation of the method for an implementation of the apparatus, and a repeated description thereof will be omitted here.

Figure 13:
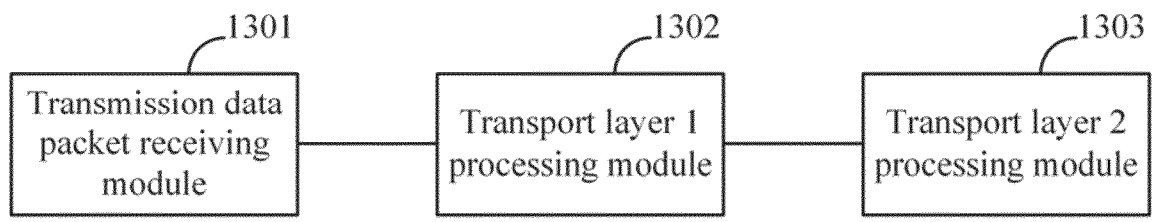
FIG. 13 is a schematic structural diagram of an apparatus for processing data in a transmitter according to an embodiment of the invention.

FIG. 13 is a schematic structural diagram of an apparatus for processing data in a transmitter, and as illustrated, the apparatus includes:

a transmission data packet receiving module 1301 is configured to receive transmission data packets transmitted from a higher layer, where the transmission data packets are data packets to be transmitted by the transmitter;

a transport layer 1 processing module 1302 is configured to process the received transmission data packets at a transport layer 1, where processing at the transport layer 1 during transmission includes: allocating SNs; and a transport layer 2 processing module 1303 is configured to process the transmission data packets processed at the transport layer 1, at a transport, layer 2, where processing at the transport layer 2 during transmission includes: passing the transmission data packets to a physical layer according to the size of a scheduled transmission resource so that they are transmitted via an air interface.

In an implementation, the transport layer 1 processing module is further configured during transmission to header-compress and security-process the data packets after allocating the SNs.

In an implementation, the transport layer 1 processing module is further configured during transmission to decide whether to segment the data packets to be initially transmitted, at the transport layer 1 according to a configuration, and/or to decide whether to segment the data packets to be retransmitted, at the transport layer 1 according to a configuration, and if so, to pass the transmission data packets segmented at the transport layer 1 to the transport layer 2 for processing, where the configuration for initial transmission of the data packets is the same as or different from the configuration for retransmission of the data packets.

In an implementation, the transport layer 1 processing module is further configured during transmission to decide whether to segment the data packets, according to a static configuration via RRC signaling.

In an implementation, the transport layer 1 processing module is further configured during transmission in the AM mode to perform one or a combination of the following processing:

to define a transmission window, to maintain the transmission window, and to transmit the data packets in the transmission window;

to set P bits in the data packets or data packet segments to trigger a receiver to feed back a status report;

to segment the data packets as configured via signaling of the network side; and to retransmit the data packets are retransmitted based upon reception status feedback of the counterpart end, or feedback information about processing at the transport layer 2.

In an implementation, the transport layer 1 processing module is further configured to perform processing at the transport layer 1 on one logic entity.

The transport layer 2 processing module is further configured to perform processing at the transport layer 2 on one or at least two logic entities.

In a particular implementation, when processing at the transport, layer 2 is performed on at least two logic entities, the logic entity performing processing at the transport layer 1 distributes the processed data packets to at least one of the two logic entities performing processing at the transport layer 2; or the logic entity performing processing at the transport layer 1 duplicates and then distributes the processed data packets to the two logic entities performing processing at the transport layer 2.

In an implementation, when processing at the transport layer 2 is performed on at least two logic entities, the transport layer 1 processing module is further configured to retransmit the data packets to a logic entity originally performing processing at the transport layer 2, or the other logic entity performing processing at the transport layer 2.

In an implementation, the transport layer 2 processing module is further configured to segment and concatenate the data packets before passim them to the physical layer.

In an implementation, the transport layer 1 processing module and/or the transport layer 2 processing module is further configured to segment and concatenate the data packets by identifying the transmission data packets to identify logical channels from which they come.

In an implementation, the transport layer 2 processing module is further configured to segment the data packets by identifying the data packets using the SNs, and to segment the data packets according to payloads of the data packets processed at the transport layer 1.

In an implementation, the transport layer 2 processing module is further configured to perform processing at the transport layer 2 on a first sub-layer protocol entity and a second sub-layer protocol entity, where the first sub-layer protocol entity receives the data packets processed at the transport layer 1, and the second sub-layer protocol entity receives the data packets processed by the first sub-layer protocol entity, so the data packets are segmented and concatenated as follows according to the size of a scheduled transmission resource:

the second sub-layer protocol entity informs the first sub-layer protocol entity of a size of the data packets after finishing a schedule;

the first sub-layer protocol entity segments and concatenates the data packets processed at the transport layer 1; and the second sub-layer protocol entity receives the data packets segmented and concatenated by the first sub-layer protocol entity, and then adds identification information to the data packets from different logic channels, multiplexes the data packets of the different logic channels into transmission channel data packets, and transmits them to the physical layer.

Figure 14:
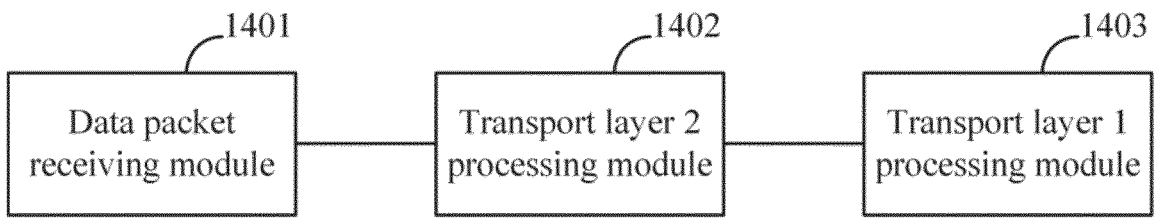
FIG. 14 is a schematic structural diagram of an apparatus for processing data in a receiver according to an embodiment of the invention.

FIG. 14 is a schematic structural diagram of an apparatus for processing data in a receiver, and as illustrated, the apparatus includes:

a data packet receiving module 1401 is configured to receive data packets received via an air interface, and then transmitted from a physical layer;

a transport layer 2 processing module 1402 is configured to process the received data packets at a transport layer 2, where processing at the transport layer 2 during reception includes: transmitting the data packets transmitted from the physical layer, to the transport layer 2; and a transport layer 1 processing module 1403 is configured to process the data packets processed at the transport layer 2, at a transport layer 1, where processing at the transport layer 1 during reception includes: reordering the data packets into transmission data packets according to their SNs, where the transmission data packets are data packets to be transmitted by a transmitter.

In an implementation, the transport layer 2 processing module is further configured during reception to re-assemble the data packets before transmitting them to the transport layer 1.

In an implementation, the transport layer 2 processing module is further configured during reception to perform processing at the transport layer 2 on first sub-layer protocol entities and a second sub-layer protocol entity, where the first sub-layer protocol entities receive the data packets processed by the second sub-layer protocol entity, and the second sub-layer protocol entity receives the data packets transmitted from the physical layer, so the data packets are re-assembled as follows:

the second sub-layer protocol entity processes data packets of different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets.

In an implementation, the transport layer 2 processing module configured to re-assemble the data packets is further configured:

to de-package data packets of each logic channel into different PDUs or PDU segments to be processed at the transport layer 1, under a packaging rule; and if the data packets are de-packaged into PDUs, to pass the PDUs to the transport layer 1 for processing, or if the data packets are de-packaged into PDU segments, then if the transport layer 1 is configured with a PDU segmentation function, to pass the PDU segments to the transport layer 1 for processing; otherwise, to compose the PDU segments into PDUs, and then pass the PDUs to the transport layer 1 for processing.

In an implementation, the transport layer 1 processing module is further configured during reception: after the data packets are reordered according to their SNs, to feed back an incorrectly received data packet, and to inversely security-process and header-decompress correctly received data packets into the transmission data packets.

In an implementation, the transport layer 1 processing module is further configured during reception to define a reception window, to maintain the reception window, and to receive and/or reorder the data packets in the reception window, where the data packets are reordered as follows:

when the data packets are received out of order, a reordering timer is started, and the highest SN in a reception queue at this time is recorded;

before the reordering timer expires, if the data packets are not received out of order, then the reordering timer will be stopped; otherwise, the reordering timer will be restarted, and the highest SN in the current reception queue will be recorded; and if the reordering timer expires, then if a PDU corresponding to some SN preceding to the recorded SN corresponding to the reordering timer has not been received, then it will be determined that the data packet fails to be transmitted.

In an implementation, the transport layer 1 processing module is further configured during reception in the AM mode to perform one or a combination of the following processing:

to define a reception window, to maintain the reception window, and to receive the data packets in the reception window; and when data lying into the reception window are received, if there is a gap in a reception sequence, to start a reordering timer, and if the data packet has not been received after the reordering timer expires, to determine that the data fail to be transmitted, and to feed a status report back to the receiver.

For the sake of a convenient description, the respective components of the apparatuses above have been described respectively as various modules or units according to their functions. Of course, the functions of the respective modules or units can be performed in the same one piece or a plurality of pieces of software or hardware.

The technical solutions according to the embodiments of the invention can be implemented as follows.

Figure 15:
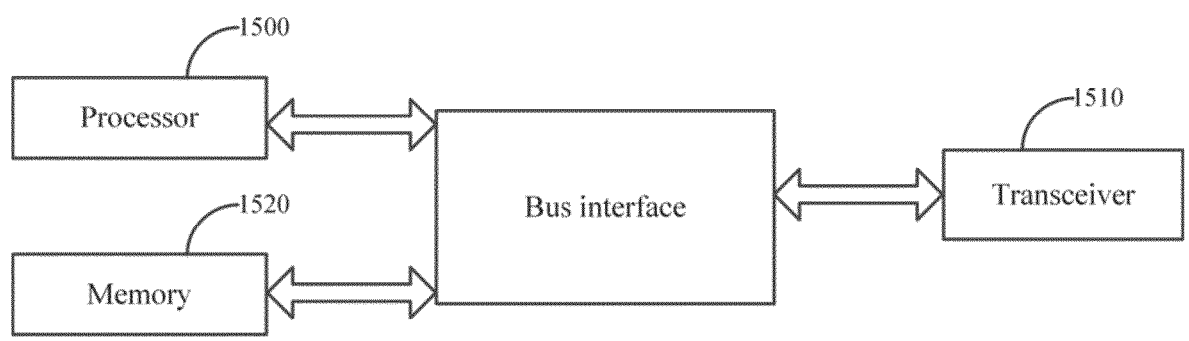
FIG. 15 is a schematic structural diagram of a transmitting device according to an embodiment of the invention.

FIG. 15 is a schematic structural diagram of a transmitter device, and as illustrated, the device includes:

a processor 1500 is configured to read and execute program in a memory 1520:

to process received transmission data packets at a transport layer 1, where processing at the transport layer 1 during transmission includes: allocating SNs; and to process the transmission data packets processed at the transport layer 1, at a transport layer 2, where processing at the transport layer 2 during transmission includes: passing the transmission data packets to a physical layer according to the size of a scheduled transmission resource so that they are transmitted via an air interface; and a transceiver 1510 is configured to receive and transmit data under the control of the processor 1500:

to receive transmission the data packets transmitted from a higher layer, where the transmission data packets are data packets to be transmitted by a transmitter.

In an implementation, processing at the transport layer 1 further includes: header-compressing and security-processing the data packets after allocating the SNs.

In an implementation, processing at the transport layer 1 during transmission further includes:

deciding whether to segment the data packets to be initially transmitted, at the transport layer 1 according to a configuration, and/or deciding whether to segment the data packets to be retransmitted, at the transport layer 1 according to a configuration, and if so, then passing the transmission data packets segmented at the transport layer 1 to the transport layer 2 for processing, where the configuration for initial transmission of the data packets is the same as or different from the configuration for retransmission of the data packets.

In an implementation, whether to segment the data packets is decided according to a static configuration via RRC signaling.

In an implementation, processing at the transport layer 1 during transmission in the AM mode further includes one or a combination of the following processing:

defining a transmission window, maintaining the transmission window, and transmitting the data packets in the transmission window;

setting P bits in the data packets or data packet segments to trigger a receiver to feed back a status report;

segmenting the data packets as configured via signaling of the network side; and retransmitting the data packets are retransmitted based upon reception status feedback of the counterpart end, or feedback information about processing at the transport layer 2.

In an implementation, processing at the transport layer 1 is performed on one logic entity.

Processing at the transport layer 2 is performed on one or at least two logic entities.

In a particular implementation, when processing at the transport layer 2 is performed on at least two logic entities, the logic entity performing processing at the transport layer 1 distributes the processed data packets to at least one of the two logic entities performing processing at the transport layer 2; or the logic entity performing processing at the transport layer 1 duplicates and then distributes the processed data packets to the two logic entities performing processing at the transport layer 2.

In an implementation, when processing at the transport layer 2 is performed on at least two logic entities, the processor is further configured:

to retransmit the data packets to a logic entity originally performing processing at the transport layer 2, or the other logic entity performing processing at the transport layer 2.

Here in FIG. 15, the bus architecture can include any number of interconnecting buses and bridges to particularly link together various circuits including one or more processors represented by the processor 1500, and one or more memories represented by the memory 1520. The bus architecture can further link together various other circuits, e.g., a peripheral device, a manostat, a power management circuit, etc., all of which are well known in the art, so a further description thereof will be omitted in this context. The bus interface serves as an interface. The transceiver 1510 can be a number of elements including a transmitters and a receiver, which provide units for communication with various other devices over a transmission medium. The processor 1500 is responsible for managing the bus architecture and performing normal processes, and the memory 1520 can store data for use by the processor 1500 in performing the operations.

Figure 16:
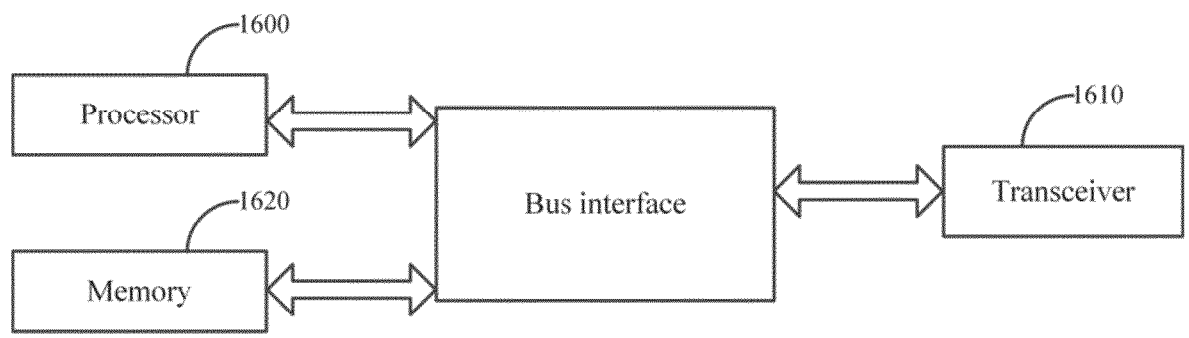
FIG. 16 is a schematic structural diagram of a receiving device according to an embodiment of the invention.

FIG. 16 is a schematic structural diagram of a receiver device, and as illustrated, the device includes:

a processor 1600 is configured to read and execute program in a memory 1620:

to process received data packets at a transport layer 2, where processing at the transport layer 2 during reception includes: transmitting the data packets transmitted from a physical layer, to the transport layer 2; and to process the data packets processed at the transport layer 2, at a transport layer 1, where processing at the transport layer 1 during reception includes: reordering the data packets into transmission data packets according to their SNs, where the transmission data packets are data packets to be transmitted by a transmitter; and a transceiver 1610 is configured to receive and transmit data under the control of the processor 1600:

to receive the data packets received via an air interface, and then transmitted from the physical layer.

In an implementation, processing at the transport layer 2 during reception further includes: re-assembling the data packets before transmitting them to the transport layer 1.

In an implementation, processing at the transport layer 2 is performed on first sub-layer protocol entities and a second sub-layer protocol entity, where the first sub-layer protocol entities receive the data packets processed by the second sub-layer protocol entity, and the second sub-layer protocol entity receives the data packets transmitted from the physical layer, so the data packets are re-assembled as follows:

the second sub-layer protocol entity processes data packets of different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets.

In an implementation, re-assembling the data packets includes:

de-packaging data packets of each logic channel into different PDUs or PDU segments to be processed at the transport layer 1, under a packaging rule; and if the data packets are de-packaged into PDUs, then passing the PDUs to the transport layer 1 for processing, or if the data packets are de-packaged into PDU segments, then if the transport layer 1 is configured with a PDU segmentation function, then passing the PDU segments to the transport layer 1 for processing; otherwise, composing the PDU segments into PDUs, and then passing the PDUs to the transport layer 1 for processing.

In an implementation, processing at the transport layer 1 processing module during reception further includes:

after the data packets are reordered according to their SNs, feeding back an incorrectly received data packet, and inversely security-processing and header-decompressing correctly received data packets into the transmission data packets.

In an implementation, processing at the transport layer 1 processing module during reception further includes:

defining a reception window, maintaining the reception window, and receiving and/or reordering the data packets in the reception window, where the data packets are reordered as follows:

when the data packets are received out of order, a reordering timer is started, and the highest SN in a reception queue at this time is recorded;

before the reordering timer expires, if the data packets are not received out of order, then the reordering timer will be stopped; otherwise, the reordering timer will be restarted, and the highest SN in the current reception queue will be recorded; and if the reordering timer expires, then if a PDU corresponding to some SN preceding to the recorded SN corresponding to the reordering timer has not been received, then it will be determined that the data packet fails to be transmitted.

In an implementation, processing at the transport layer 1 during transmission in the AM mode includes one or a combination of the following processing:

defining a reception window, maintaining the reception window, and receiving the data packets in the reception window; and when data lying into the reception window are received, if there is a gap in a reception sequence, then starting a reordering timer, and if the data packet has not been received after the reordering timer expires, then determining that the data fail to be transmitted, and feeding a status report back to the receiver.

Here, in FIG. 16, the bus architecture can include any number of interconnecting buses and bridges to particularly link together various circuits including one or more processors represented by the processor 1600, and one or more memories represented by the memory 1620. The bus architecture can further link together various other circuits, e.g., a peripheral device, a manostat, a power management circuit, etc., all of which are well known in the art, so a further description thereof will be omitted in this context. The bus interface serves as an interface. The transceiver 1610 can be a number of elements including a transmitters and a receiver, which provide units for communication with various other devices over a transmission medium. The processor 1600 is responsible for managing the bus architecture and performing normal processes, and the memory 1620 can store data for use by the processor 1600 in performing the operations.

In summary, in the embodiments of the invention, the layer two protocol is structured into two layers, where the higher layer is responsible for maintaining SNs, handling a window, security, encryption, reordering, an ARQ, and other functions, and the lower high is responsible for packaging based upon the higher-layer SNs, mapping logic channels to transmission channels, and other functions.

Particularly, there are a common process on the L2 high layer transmitter in the UM and the AM; a common process on the l2 high layer receiver in the UM and the AM; an implementation of one or two sub-layers on the L2 low layer transmitter; an implementation of one or two sub-layers on the L2 low layer receiver; a process on the L2 high transmitter in the AM; a process on the L2 high layer receiver in the AM; a segmentation function at the L2 high layer; which includes segmentation for initial transmission, and segmentation for retransmission; and packaging at the L2 low layer based upon the higher-layer SNs; processing segments at the L2 low layer, where when the high layer is configured with a segment function, the segments can be transmitted to the high layer; otherwise, the segments will not be transmitted thereto; etc.

With the data transmitting solutions according to the embodiments of the invention, the data of the UE can be transmitted efficiently over different paths, and the centralized protocol layers can feed back a reception state, retransmit the data, segment the data as appropriate, and perform other operations to adapt to the conditions of the different links so that the UE can transmit the data efficiently at a shorter delay, thus improving the efficiency of the system, and the user experience.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for processing data in a transmitter, the method comprising:

receiving transmission data packets passed through a higher layer, wherein the transmission data packets are data packets to be transmitted by a transmitter;

processing the received transmission data packets at a transport layer 1, wherein processing at the transport layer 1 during transmission comprises: allocating Sequence Numbers, SNs; and processing the transmission data packets processed at the transport layer 1, at a transport layer 2, wherein processing at the transport layer 2 during transmission comprises: passing the transmission data packets to a physical layer according to a size of a scheduled transmission resource so that they are transmitted via an air interface;

wherein processing at the transport layer 1 during transmission further comprises at least one of:

deciding whether to segment the data packets to be initially transmitted, at the transport layer 1 according to a configuration; or deciding whether to segment the data packets to be retransmitted, at the transport layer 1 according to a configuration, and if so, passing the transmission data packets segmented at the transport layer 1 to the transport layer 2 for processing, wherein the configuration for initial transmission of the data packets is the same as or different from the configuration for retransmission of the data packets.

2. The method according to claim 1, wherein processing at the transport layer 1 during transmission in an Acknowledged Mode, AM mode further comprises at least one of
defining a transmission window, maintaining the transmission window, and transmitting the data packets in the transmission window;
setting P bits in the data packets or data packet segments to trigger a receiver to feed back a status report;
segmenting the data packets as configured via signaling of the network side; or
retransmitting the data packets are retransmitted based upon reception status feedback of the counterpart end, or feedback information about processing at the transport layer 2.

3. The method according to claim 1, wherein processing at the transport layer 1 is performed on one logic entity; and
processing at the transport layer 2 is performed on one or at least two logic entities.

4. The method according to claim 3, wherein when processing at the transport layer 2 is performed on at least two logic entities, the logic entity performing processing at the transport layer 1 distributes the processed data packets to at least one of the two logic entities performing processing at the transport layer 2; or
the logic entity performing processing at the transport layer 1 duplicates and distributes the processed data packets to the two logic entities performing processing at the transport layer 2.

5. The method according to claim 3, wherein when processing at the transport layer 2 is performed on at least two logic entities, the method further comprises:
retransmitting the data packets to a logic entity originally performing processing at the transport layer 2, or the other logic entity performing processing at the transport layer 2.

6. The method according to claim 1, wherein processing at the transport layer 2 further comprises: segmenting and concatenating the data packets before passing them to the physical layer;
wherein the data packets are segmented and concatenated by identifying the transmission data packets to identify logical channels from which they come; or the data packets are segmented by identifying the data packets using the SNs, and the data packets are segmented according to payloads of the data packets processed at the transport layer 1;
or
processing at the transport layer 2 further comprises: segmenting and concatenating the data packets before passing them to the physical layer;
wherein processing at the transport layer 2 is performed on a first sub-layer protocol entity and a second sub-layer protocol entity, wherein the first sub-layer protocol entity receives the data packets processed at the transport layer 1, and the second sub-layer protocol entity receives the data packets processed by the first sub-layer protocol entity, so the data packets are segmented and concatenated as follows according to the size of a scheduled transmission resource:

the second sub-layer protocol entity informs the first sub-layer protocol entity of a size of the data packets after finishing a schedule;
the first sub-layer protocol entity segments and concatenates the data packets processed at the transport layer 1; and
the second sub-layer protocol entity receives the data packets segmented and concatenated by the first sub-layer protocol entity, and adds identification information to the data packets from different logic channels, multiplexes the data packets of the different logic channels into transmission channel data packets, and transmits them to the physical layer.

7. A method for processing data in a receiver, the method comprising:
receiving data packets received via an air interface, and passed through a physical layer;
processing the received data packets at a transport layer 2, wherein processing at the transport layer 2 during reception comprises: transmitting the data packets transmitted from the physical layer, to the transport layer 2; and
processing the data packets processed at the transport layer 2, at a transport layer 1, wherein processing at the transport layer 1 during reception comprises: reordering the data packets into transmission data packets according to their Sequence Numbers, SNs, wherein the transmission data packets are data packets to be transmitted by a transmitter;
wherein processing at the transport layer 2 during reception further comprises: re-assembling the data packets before transmitting them to the transport layer 1;
wherein processing at the transport layer 2 is performed on first sub-layer protocol entities and a second sub-layer protocol entity, wherein the first sub-layer protocol entities receive the data packets processed by the second sub-layer protocol entity, and the second sub-layer protocol entity receives the data packets transmitted from the physical layer, so the data packets are re-assembled as follows:
the second sub-layer protocol entity processes data packets of different logic channels among the data packets transmitted from the physical layer respectively, and thereafter transmits the data packets of each logic channel to corresponding one of the first sub-layer protocol entities for processing; and
the respective first sub-layer protocol entities re-assemble the received data packets;
or
processing at the transport layer 2 during reception further comprises: re-assembling the data packets before transmitting them to the transport layer 1
wherein re-assembling the data packets comprises:
de-packaging data packets of each logic channel into different Protocol Data Unit, PDUs or PDU segments to be processed at the transport layer 1, under a packaging rule; and
if the data packets are de-packaged into PDUs, passing the PDUs to the transport layer 1 for processing, or
if the data packets are de-packaged into PDU segments, then if the transport layer 1 is configured with a PDU segmentation function, passing the PDU segments to the transport layer 1 for processing; otherwise, composing the PDU segments into PDUs, and passing the PDUs to the transport layer 1 for processing.

8. The method according to claim 7, wherein processing at the transport layer 1 during reception further comprises:

defining a reception window, maintaining the reception window, and implementing at least one of:
receiving the data packets in the reception window, and reordering the data packets in the reception window, wherein the data packets are reordered as follows:
when the data packets are received out of order, a reordering timer is started, and the highest SN in a reception queue at this time is recorded;
before the reordering timer expires, if the data packets are not received out of order, the reordering timer will be stopped; otherwise, the reordering timer will be restarted, and the highest SN in the current reception queue will be recorded; and
if the reordering timer expires, then if a Protocol Data Unit, PDU corresponding to some SN preceding to the recorded SN corresponding to the reordering timer has not been received, it will be determined that the data packet fails to be transmitted.

9. The method according to claim 8, wherein processing at the transport layer 1 during transmission in an Acknowledged Mode, AM mode further comprises at least one of:
defining a reception window, maintaining the reception window, and receiving the data packets in the reception window; or
when data lying into the reception window are received, if there is a gap in a reception sequence, starting a reordering timer, and if the data packet has not been received after the reordering timer expires, determining that the data fail to be transmitted, and feeding a status report back to the receiver.

10. An apparatus for processing data, the apparatus comprising:
a processor configured to read and execute program in a memory:
to process received transmission data packets at a transport layer 1, wherein processing at the transport layer 1 during transmission comprises: allocating Sequence Numbers, SNs; and
to process the transmission data packets processed at the transport layer 1, at a transport layer 2, wherein processing at the transport layer 2 during transmission comprises: passing the transmission data packets to a physical layer according to the size of a scheduled transmission resource so that they are transmitted via an air interface; and
a transceiver configured to receive and transmit data under the control of the processor:
to receive transmission the data packets passed through a higher layer, wherein the transmission data packets are data packets to be transmitted by a transmitter;
wherein processing at the transport layer 1 during transmission further comprises at least one of:
deciding whether to segment the data packets to be initially transmitted, at the transport layer 1 according to a configuration, or
deciding whether to segment the data packets to be retransmitted, at the transport layer 1 according to a configuration, and if so, passing the transmission data packets segmented at the transport layer 1 to the transport layer 2 for processing, wherein the configuration for initial transmission of the data packets is the same as or different from the configuration for retransmission of the data packets.

11. The apparatus according to claim 10, wherein processing at the transport layer 1 during transmission in an Acknowledged Mode, AM mode further comprises at least one of:
defining a transmission window, maintaining the transmission window, and transmitting the data packets in the transmission window;
setting P bits in the data packets or data packet segments to trigger a receiver to feed back a status report;
segmenting the data packets as configured via signaling of the network side; or
retransmitting the data packets are retransmitted based upon reception status feedback of the counterpart end, or feedback information about processing at the transport layer 2.

12. The apparatus according to claim 10, wherein processing at the transport layer 1 is performed on one logic entity; and
processing at the transport layer 2 is performed on one or at least two logic entities.

13. The apparatus according to claim 12, wherein when processing at the transport layer 2 is performed on at least two logic entities, the logic entity performing processing at the transport layer 1 distributes the processed data packets to at least one of the two logic entities performing processing at the transport layer 2; or
the logic entity performing processing at the transport layer 1 duplicates and distributes the processed data packets to the two logic entities performing processing at the transport layer 2.

14. The apparatus according to claim 12, wherein when processing at the transport layer 2 is performed on at least two logic entities, the processor is further configured:
to retransmit the data packets to a logic entity originally performing processing at the transport layer 2, or the other logic entity performing processing at the transport layer 2.

15. An apparatus for processing data, comprising:
a transceiver configured to receive and transmit data under control of a processor:
to receive data packets received via an air interface, and passed through the physical layer; and
the processor, configured to read and execute a program in a memory to implement:
processing the received data packets at a transport layer 2, wherein processing at the transport layer 2 during reception comprises: transmitting the data packets transmitted from the physical layer, to the transport layer 2; and
processing the data packets processed at the transport layer 2, at a transport layer 1, wherein processing at the transport layer 1 during reception comprises: reordering the data packets into transmission data packets according to their Sequence Numbers, SNs, wherein the transmission data packets are data packets to be transmitted by a transmitter;
wherein processing at the transport layer 2 during reception further comprises: re-assembling the data packets before transmitting them to the transport layer 1;
wherein processing at the transport layer 2 is performed on first sub-layer protocol entities and a second sub-layer protocol entity, wherein the first sub-layer protocol entities receive the data packets processed by the second sub-layer protocol entity, and the second sub-layer protocol entity receives the data packets transmitted from the physical layer, so the data packets are re-assembled as follows:
the second sub-layer protocol entity processes data packets of different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets;

or processing at the transport layer 2 during reception further comprises: re-assembling the data packets before transmitting them to the transport layer 1, wherein re-assembling the data packets comprises:

de-packaging data packets of each logic channel into different Protocol Data Unit, PDUs or PDU segments to be processed at the transport layer 1, under a packaging rule; and if the data packets are de-packaged into PDUs, passing the PDUs to the transport layer 1 for processing, or if the data packets are de-packaged into PDU segments, then if the transport layer 1 is configured with a PDU segmentation function, passing the PDU segments to the transport layer 1 for processing; otherwise, composing the PDU segments into PDUs, and passing the PDUs to the transport layer 1 for processing.

16. The apparatus according to claim 15, wherein processing at the transport layer 2 during reception further comprises: re-assembling the data packets before transmitting them to the transport layer 1;

wherein processing at the transport layer 2 is performed on first sub-layer protocol entities and a second sub-layer protocol entity, wherein the first sub-layer protocol entities receive the data packets processed by the second sub-layer protocol entity, and the second sub-layer protocol entity receives the data packets transmitted from the physical layer, so the data packets are re-assembled as follows:

the second sub-layer protocol entity processes data packets of different logic channels among the data packets transmitted from the physical layer respectively, and thereafter transmits the data packets of each logic channel to corresponding one of the first sub-layer protocol entities for processing; and the respective first sub-layer protocol entities re-assemble the received data packets;

or processing at the transport layer 2 during reception further comprises: re-assembling the data packets before transmitting them to the transport layer 1;

wherein re-assembling the data packets comprises:

de-packaging data packets of each logic channel into different Protocol Data Unit, PDUs or PDU segments to be processed at the transport layer 1, under a packaging rule; and if the data packets are de-packaged into PDUs, passing the PDUs to the transport layer 1 for processing, or if the data packets are de-packaged into PDU segments, then if the transport layer 1 is configured with a PDU segmentation function, passing the PDU segments to the transport layer 1 for processing; otherwise, composing the PDU segments into PDUs, and passing the PDUs to the transport layer 1 for processing.

17. The apparatus according to claim 15, wherein processing at the transport layer 1 during reception further comprises:

defining a reception window, maintaining the reception window, and implementing at least one of:

receiving the data packets in the reception window, and reordering the data packets in the reception window, wherein the data packets are reordered as follows:

when the data packets are received out of order, a reordering timer is started, and the highest SN in a reception queue at this time is recorded;

before the reordering timer expires, if the data packets are not received out of order, the reordering timer will be stopped; otherwise, the reordering timer will be restarted, and the highest SN in the current reception queue will be recorded; and if the reordering timer expires, then if a Protocol Data Unit, PDU corresponding to some SN preceding to the recorded SN corresponding to the reordering timer has not been received, it will be determined that the data packet fails to be transmitted.

* * * * *